United States Patent
Cholhan et al.

(10) Patent No.: US 10,703,493 B2
(45) Date of Patent: Jul. 7, 2020

(54) DANGER AVOIDANCE APPARATUS AND METHOD OF USE

(71) Applicant: CHOPRIX LLC, Rochester, NY (US)

(72) Inventors: Hilary J. Cholhan, Rochester, NY (US); Remy Cholhan, Rochester, NY (US)

(73) Assignee: CHOPRIX LLC, Rochester, NY (US)

( * ) Notice: Subject to any disclaimer, the term of this patent is extended or adjusted under 35 U.S.C. 154(b) by 495 days.

(21) Appl. No.: 15/468,539

(22) Filed: Mar. 24, 2017

(65) Prior Publication Data

US 2017/0190432 A1 Jul. 6, 2017

Related U.S. Application Data

(63) Continuation of application No. PCT/US2015/052065, filed on Sep. 24, 2015.
(Continued)

(51) Int. Cl.
B64D 17/74 (2006.01)
B64D 17/02 (2006.01)
(Continued)

(52) U.S. Cl.
CPC .......... B64D 17/74 (2013.01); B64D 17/025 (2013.01); B64D 17/40 (2013.01); G08B 21/10 (2013.01);
(Continued)

(58) Field of Classification Search
CPC ...... B64D 17/74; B64D 17/40; B64D 17/025; B64D 17/24; G08B 25/10; G08B 25/009;
(Continued)

(56) References Cited

U.S. PATENT DOCUMENTS 4,497,272 A * 2/1985 Veazey ................ B64D 17/025
114/102.29
5,071,089 A * 12/1991 Fagan ................... A63C 11/00
244/16
(Continued)

FOREIGN PATENT DOCUMENTS

DE 1143394 B 2/1963
DE 29503057 U1 4/1995
(Continued)

OTHER PUBLICATIONS

International Search Report and Written Opinion of the International Searching Authority issued for PCT Application No. PCT/US2015/052065 dated Feb. 1, 2016.
(Continued)

*Primary Examiner* — Assres H Woldemaryam
(74) *Attorney, Agent, or Firm* — Heslin Rothenberg Farley & Mesiti P.C.

(57) ABSTRACT

The present disclosure provides danger avoidance apparatuses and related methods, such as for use to avoid avalanches. An apparatus may include a container configured to couple to a user, a lift providing mechanism, a descent control mechanism and at least one rip cord engaged with the container and selectively operable by the user. Both the lift providing mechanism and the descent control mechanism may be movably coupled to the container between a packed position within the container and a deployed position exterior to the container controlled via the at least one rip cord. The lift providing mechanism may include an airfoil that provides lift to the user at a first velocity of the user along a first direction. The descent control mechanism may control the descent and reduce the velocity of the user along the first direction from the first velocity in the deployed position.

28 Claims, 14 Drawing Sheets

Related U.S. Application Data

(60) Provisional application No. 62/054,480, filed on Sep. 24, 2014.

(51) Int. Cl.

| | | |
|---|---|---|
| *B64D 17/40* | (2006.01) | |
| *G08B 21/10* | (2006.01) | |
| *G08B 25/00* | (2006.01) | |
| *G08B 25/10* | (2006.01) | |
| *A63B 29/02* | (2006.01) | |
| *B64D 17/24* | (2006.01) | |

(52) U.S. Cl.
CPC ........... *G08B 25/009* (2013.01); *G08B 25/10* (2013.01); *A63B 29/02* (2013.01); *A63B 2220/801* (2013.01); *A63B 2225/01* (2013.01); *A63B 2225/50* (2013.01); *B64D 17/24* (2013.01)

(58) Field of Classification Search
CPC . G08B 21/10; A63B 2225/50; A63B 2225/01; A63B 29/02; A63B 2220/801
See application file for complete search history.

(56) References Cited

U.S. PATENT DOCUMENTS

| | | | |
|---|---|---|---|
| 5,200,736 A | 4/1993 | Coombs et al. | |
| 5,904,324 A * | 5/1999 | Di Bella | B64D 17/34 |
| | | | 244/142 |
| 6,223,682 B1 | 5/2001 | Venier | |
| 6,889,942 B2 | 5/2005 | Preston | |
| 8,240,610 B1 * | 8/2012 | Cooper | A41D 13/0155 |
| | | | 244/143 |
| 2003/0197095 A1 | 10/2003 | Preston | |
| 2004/0155153 A1 * | 8/2004 | Booth | B64D 17/38 |
| | | | 244/149 |
| 2004/0262449 A1 * | 12/2004 | Rebelle | A63C 5/11 |
| | | | 244/4 A |
| 2006/0186272 A1 * | 8/2006 | Roseman | B64D 17/025 |
| | | | 244/142 |
| 2007/0177651 A1 | 8/2007 | Daugherty et al. | |
| 2008/0149774 A1 | 6/2008 | Giles | |
| 2010/0227585 A1 | 9/2010 | Carroll et al. | |
| 2011/0298613 A1 | 12/2011 | Ayed | |
| 2012/0025028 A1 * | 2/2012 | Suze | B64D 17/38 |
| | | | 244/149 |
| 2012/0265477 A1 | 10/2012 | Vock et al. | |
| 2012/0286933 A1 | 11/2012 | Hsiao | |
| 2013/0060168 A1 | 3/2013 | Chu et al. | |
| 2013/0092796 A1 * | 4/2013 | Weinel | A45C 13/021 |
| | | | 244/149 |
| 2013/0278416 A1 | 10/2013 | Button et al. | |
| 2015/0102171 A1 * | 4/2015 | Reinpold | B64D 17/30 |
| | | | 244/143 |

FOREIGN PATENT DOCUMENTS

| | | |
|---|---|---|
| FR | 2637809 A1 | 4/1990 |
| WO | 2010051287 A1 | 5/2010 |

OTHER PUBLICATIONS

International Search Report and Written Opinion of the International Searching Authority issued for PCT Application No. PCT/US2014/054210 dated May 19, 2015.
International Preliminary Report on Patentability and Written Opinion of the International Searching Authority issued for PCT Application No. PCT/US2014/031984 dated Sep. 29, 2015.
Extended European Search Report and Opinion issued in European Patent Application No. 15844145.1 dated Jun. 22, 2018.

* cited by examiner

DANGER AVOIDANCE APPARATUS AND METHOD OF USE

CROSS-REFERENCE TO RELATED APPLICATION(S)

This application is a National Stage Continuation Application of PCT Application No. PCT/US2015/052065 filed on Sep. 24, 2015 which claimed priority from Provisional Application No. 62/054,480, filed Sep. 24, 2014, which is hereby expressly incorporated herein by reference in its entirety and the benefit thereof claimed. This application is related to commonly owned International PCT Appl. No. PCT/US14/54210, U.S. Utility patent application Ser. No. 14/227,493 and U.S. Utility patent application Ser. No. 14/227,499, the entirety of which are hereby expressly incorporated herein by reference in their entirety.

FIELD OF INVENTION

The present disclosure relates generally to a danger avoidance apparatus including a lift providing mechanism and a descent control mechanism, and, optionally, a danger avoidance device including a lift providing mechanism, a descent control mechanism and an emergency notification system.

BACKGROUND

Participation in many outdoor activities often comes with a risk of being injured and possibly stranded. For example, in relatively cold climates activities such as but not limited to backcountry and off-piste skiing, on-piste skiing, side country skiing, snowboarding, snowshoeing, mountaineering, hiking and snowmobiling carry a risk of being involved in an avalanche. As another example, riding a motorcycle is a well-known pastime that carries with it a high risk of head injury in the event of an accident.

A number of devices and equipment currently exist that assist a participant in mitigating the dangers of such activities and the like, such as avalanches. These devices include beacons, shovels, probes, and airbag systems. These current devices, however, in no way act to physically remove the users from the danger, such as an onrushing avalanche. Instead, these devices aim to limit or mitigate the danger as and/or after the danger occurs and injures the participant. Simply stated, these existing devices do not prevent injury in the first place, no less prevent such injuries from occurring by removing the participant from the danger. These safety devices do not prevent a participant from directly contacting the down-rushing mass of the avalanche. Existing safety devices thus predispose the participant to injury and/or burial via an avalanche or similar danger.

A need therefore exists for apparatuses and related methods that physically remove a user from such dangers (e.g., an avalanche and similar dangers) in order to minimize the potential of injury to a participant.

SUMMARY OF THE INVENTION

In one aspect, the application provides a danger avoidance apparatus. The apparatus includes a container configured to couple to a user. The apparatus also includes a lift providing mechanism movably coupled to the container between a packed position within the container and a deployed position exterior to the container including an airfoil that provides lift to the user at a first velocity of the user along a first direction. The apparatus further includes a descent control mechanism movably coupled to the container between a packed position within the container and a deployed position exterior to the container that controls the descent and reduces the velocity of the user along the first direction from the first velocity. The apparatus also includes at least one rip cord engaged with the container and selectively operable by the user. The at least one rip cord is configured to activate the lift providing mechanism from its packed position to its deployed position and subsequently activate the descent control mechanism from its packed position to its deployed position upon the selective operation of the at least one rip cord by the user.

In some embodiments, the lift providing mechanism and the descent control mechanism are each movably coupled to the container via suspension lines. In some such embodiments, the container is operable to allow for activation of the lift providing mechanism prior to activation of the descent control mechanism. In some such embodiments, the container is operable to allow for activation of the descent control mechanism without interference with the previously activated lift providing mechanism. In some such embodiments, the lift providing mechanism and the descent control mechanism are provided within a first compartment of the container. In some other such embodiments, the lift providing mechanism is provided within a first compartment of the container and the descent control mechanism is provided within a second compartment of the container. In some such embodiments, the first compartment of the container is positioned at least one of above and ahead in the first direction of the second compartment.

In some embodiments, at least one of the lift providing mechanism and the suspension lines of the lift providing mechanism are configured to provide the deployment position of the lift providing mechanism substantially directly overhead of the user. In some such embodiments, at least one of the descent control mechanism and the suspension lines of the lift providing mechanism are configured to provide the deployment position of the descent control mechanism substantially behind the deployment position of the lift providing mechanism along the first direction.

In some embodiments, the descent control mechanism does not provide lift to the container. In some embodiments, the container is configured to removably couple to the user. In some such embodiments, the container includes at least one of a leg strap and a shoulder strap. In some such embodiments, the container includes at least one leg strap and at least one shoulder strap, and wherein a substantially stiff back extends between the at least one leg strap and at least one shoulder strap. In some embodiments, the apparatus is configured to removably couple to a device that is configured to removably couple to the user.

In some such embodiments, the lift providing mechanism comprises a non-rigid material configured to form the airfoil in the deployed position. In some embodiments, the descent control mechanism comprises a non-rigid material configured to form a descending canopy in the deployed position. In some embodiments, the at least one rip cord is configured to activate the lift providing mechanism from its packed position to its deployed position upon a first selective operation of the rip cord and to activate the descent control mechanism from its packed position to its deployed position upon a second selective operation of the rip cord subsequent to the first operation. In some embodiments, the at least one rip cord includes a first rip cord configured to activate the lift providing mechanism from its packed position to its deployed position upon selective operation of the first rip cord, and a second rip cord configured to activate the descent control mechanism from its packed position to its deployed position upon selective operation of the second rip cord.

In some such embodiments, the apparatus further includes a sensor communicatively coupled to the at least one rip cord, the sensor being activated responsive to the selective operation of the at least one rip cord. In some such embodiments, the apparatus further includes a microcontroller communicatively coupled to the sensor configured to obtain an alert from the sensor when the sensor is activated. In some such embodiments, the apparatus further includes a communication device communicatively coupled to the microcontroller and configured to communicate the alert to a node on a communications network external to the apparatus. In some such embodiments, the microcontroller is communicatively coupled to the communication device and the sensor, wherein the microcontroller is configured to relay communication between the sensor and the communication device, and the microcontroller is further configured to supplement communications through the microcontroller with additional data. In some other such embodiments, the apparatus further includes a location device communicatively coupled to the microcontroller, the microcontroller obtaining location information from the location device, and the alert including the location information. In some other such embodiments, the apparatus further includes a manual alert button communicatively coupled to the microcontroller, such that activating the manual alert button sends the alert to the communication device. In some embodiments, the apparatus further includes a belt portion comprising a closure, wherein at least one of the microcontroller, manual alert button, location device, and the communication device are internal to the closure.

In some embodiments, upon activation of the lift providing mechanism via the at least one rip cord while the user is traveling at least at the first velocity along the first direction the lift providing mechanism lifts the user from a first location on the ground surface and translates the user to a first elevated position off the ground surface. In some such embodiments, upon activation of the descent control mechanism via the at least one rip cord subsequent to activation of the lift providing mechanism it navigates the user from the first elevated position to a second location on the ground surface. In some embodiments, the apparatus further includes a memory configured to store a unique identifier; a processor in communication with the memory; a trigger in communication with the processor, wherein the trigger is activated by selective operation of the at least one rip cord by the user; a location device in communication with the processor; and a transponder in communication with the processor, wherein the combined apparatus is configured to perform a method, the method includes: obtaining, by the processor, data indicating that the trigger has been activated; determining, by the processor, that the data indicates an emergency condition; based on the determining, obtaining, by the processor, location information from the location device; based on the determining, obtaining, by the processor, the unique identifier from the memory; and communicating, by the processor, the location information and the unique identifier to a node via a network connection by accessing the transponder.

In some embodiments, the lift providing mechanism and the descent control mechanism are the same mechanism. In some such embodiments, the apparatus further includes a sensor communicatively coupled to the at least one rip cord, the sensor being activated responsive to the selective operation of the at least one rip cord. In some such embodiments, the apparatus further includes a microcontroller communicatively coupled to the sensor configured to obtain an alert from the sensor when the sensor is activated. In some such embodiments, the apparatus further includes a communication device communicatively coupled to the microcontroller and configured to communicate the alert to a node on a communications network external to the apparatus. In some such embodiments, the microcontroller is communicatively coupled to the communication device and the sensor, the microcontroller being configured to relay communication between the sensor and the communication device, and the microcontroller being further configured to supplement communications through the microcontroller with additional data. In some other such embodiments, the apparatus further includes a location device communicatively coupled to the microcontroller, the microcontroller obtaining location information from the location device, and the alert including the location information. In some such embodiments, the apparatus further includes a manual alert button communicatively coupled to the microcontroller, activating the manual alert button being configured to send the alert to the communication device.

In another aspect, the present disclosure provides a danger avoidance apparatus. The apparatus includes a container configured to couple to a user. The apparatus further includes a combined lift providing and descent control mechanism movably coupled to the container between a packed position within the container and a deployed position exterior to the container including an airfoil that provides lift to the user at a first velocity of the user along a first direction and a canopy that controls the descent and reduces the velocity of the user along the first direction from the first velocity. The apparatus also includes at least one rip cord engaged with the container and selectively operable by the user. The at least one rip cord is configured to activate the lift providing and descent control mechanism from its packed position to its deployed position upon the selective operation of the at least one rip cord by the user.

Computer systems, computer program products, wearable objects, and methods relating to one or more aspects of the disclosure are also described and may be claimed herein. Further, services relating to one or more aspects of the disclosure are also described and may be claimed herein.

Additional features of the danger avoidance apparatus are realized through the present disclosure. Other embodiments and aspects of the disclosure are described in detail herein and are considered a part of the claimed inventions.

BRIEF DESCRIPTION OF DRAWINGS

The foregoing and objects, features, and advantages of one or more aspects of the disclosure are apparent from the following detailed description taken in conjunction with the accompanying drawings in which.

DETAILED DESCRIPTION OF THE INVENTION

Figure 1:
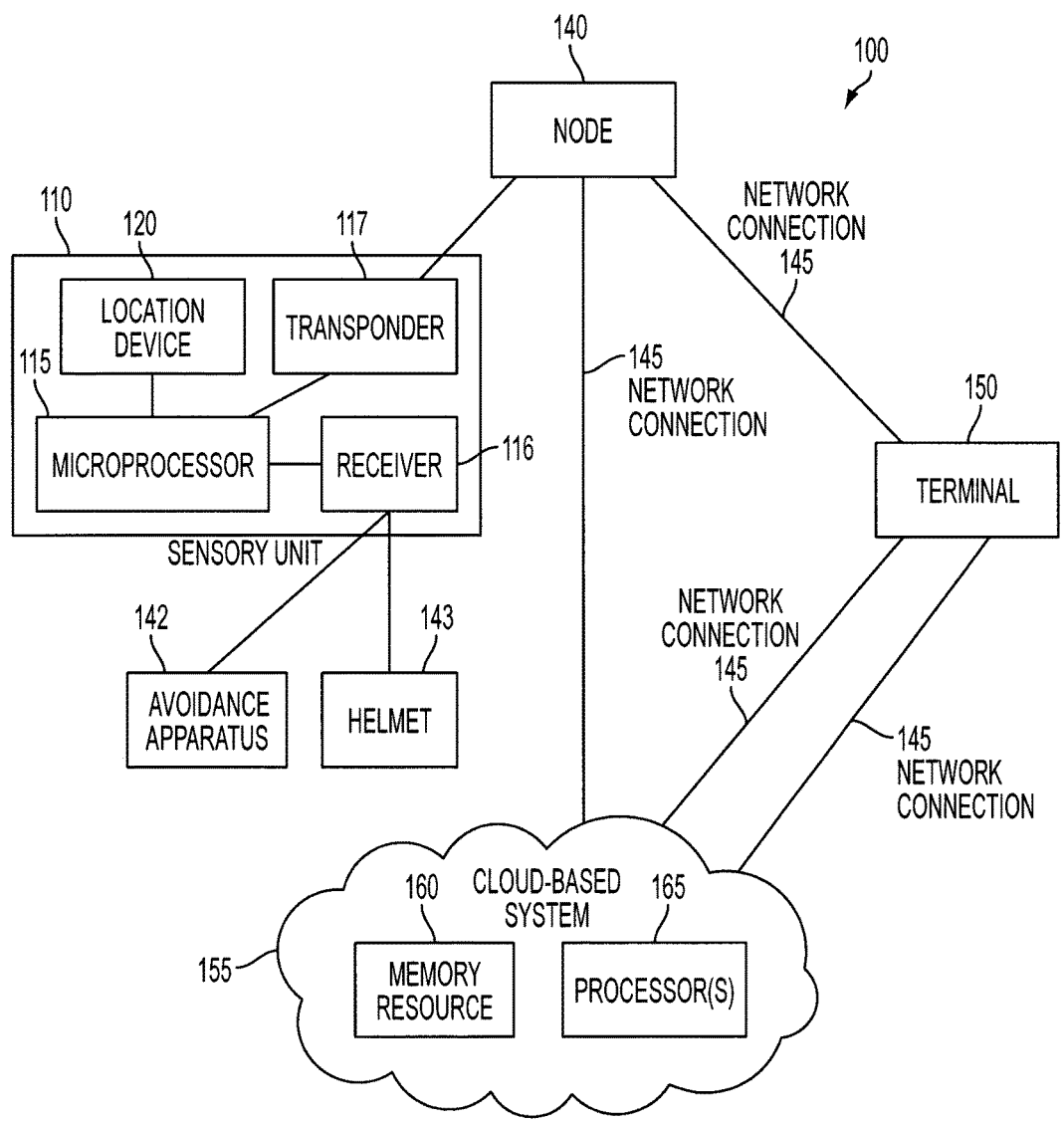
FIG. 1 is an embodiment of an apparatus or system that practices one or more aspects of the present disclosure.

Aspects of the present disclosure and certain features, advantages, and details thereof, are explained more fully below with reference to the non-limiting examples illustrated in the accompanying drawings. Descriptions of well-known materials, fabrication tools, processing techniques, etc., are omitted so as not to obscure unnecessarily the disclosure in detail. It should be understood, however, that the detailed description and the specific examples, while indicating aspects of the disclosure, are given by way of illustration only, and not by way of limitation. Various substitutions, modifications, additions, and/or arrangements, within the spirit and/or scope of the underlying inventive concepts will be apparent to those skilled in the art from this disclosure.

A need exists for apparatuses and related methods that can move an individual away from a dangerous condition, such as an avalanche. In a case where an avalanche is the dangerous condition, an embodiment of the present disclosure is an avalanche avoidance apparatus that can lift a user in danger of an avalanche off the ground surface and carry them away from an approaching cascading avalanche. The term "ground surface" is used herein to refer to the surface on which the user is positioned on or above at a particular time, which may be snow, ice, grass, dirt, pavement, etc. In an embodiment of the present disclosure, once the user of the apparatus is sufficiently separated from the hazard for a sufficient time period and/or distance, the apparatus provides a safe descent to the ground surface. In one exemplary embodiment of the present disclosure, upon removing the user from the hazard (i.e., activating the apparatus to lift the user off the ground surface), the activated apparatus also provides the user a slow descent and allows the user to navigate to a second location on the ground surface that is preferably no-longer-hazardous. As described further below, the apparatus may include a location device, and such location device may track the user upon activation of the device provide an indication of the descent or landing point.

An embodiment of the present disclosure is an apparatus that includes a lift providing mechanism and a descent control mechanism within a wearable container that protects its wearer during catastrophic events, such as an avalanche, by physically removing the user away from the underlying danger. Embodiments of the present disclosure may be referred to by using the original term, Karachute™. An embodiment of the present disclosure includes a danger avoidance apparatus that includes a lift providing mechanism and a descent control mechanism, packaged into a container worn by a user, or into an attachment to a device being worn by a user, (e.g., a backpack), which would provide for selective deployment of the lift providing mechanism, followed by deployment of the descent control mechanism. In an embodiment of the present disclosure, the lift providing mechanism and/or the descent control mechanism, and thereby at least a portion of the apparatus is of an ultra-light weight material for ease of use.

In one example, a user of an apparatus, device or system of the present disclosure may be a skier or a snowboarder or other outdoor enthusiast. In the event of such a user, after sensing an approaching avalanche, the wearer may selectively (or the device may automatically) sequentially deploy the lift providing mechanism and the descent control mechanism via a rip cord, draw cord or the like. As noted above, U.S. patent application Ser. No. 14/227,493, and U.S. patent application Ser. No. 14/227,499, both entitled "EMERGENCY NOTIFICATION APPARATUS AND METHOD," both filed Mar. 27, 2014, and International Application Number PCT/US14/54210, entitled "HELMET AND METHOD OF USE FOR EMERGENCY NOTIFICATION," filed Sep. 5, 2014, are incorporated herein by reference in their entirety. These applications disclose, inter alia, one or more emergency notification systems, or components thereof, that may be incorporated or utilized with the danger avoidance apparatus, systems, device and methods. Aspects of the disclosed apparatus, systems, device and methods can thereby be used, for example, to avoid danger and/or alert emergency responders to emergencies, such as a dangers or injury during skiing, hiking, biking, motorcycling, etc. In this way, the apparatus and the like disclosed herein may incorporate any portion of earlier disclosed emergency notification systems and apparatus. The apparatus, systems, device and methods of the present disclosure are also suitable for use in an avalanche-related emergency, as described in U.S. patent application Ser. No. 14/227,493, U.S. patent application Ser. No. 14/227,499, and International PCT Application No. PCT/US14/54210.

U.S. patent application Ser. No. 14/227,493, U.S. patent application Ser. No. 14/227,499 and International Application Number PCT/US14/54210 describe a sensory unit (SU) and location device that can be configured to communicate with further elements of an emergency response system or apparatus. As described in these applications, one such element that can communicate with the SU and location device, and can work in conjunction with an emergency alert system, is a danger avoidance apparatus with a lift providing mechanism and a descent control mechanism (e.g., a "Karachute"™). Embodiments of such an apparatus may include one or more sensors and/or alert mechanisms, which ultimately communicate with a cloud-hosted alert system described in these pending applications, and, potentially, to emergency personnel.

For example, the present disclosure describes danger avoidance embodiments that may work in conjunction with elements or aspects of the system described in any of U.S. patent application Ser. No. 14/227,493, U.S. patent application Ser. No. 14/227,499, and International Application Number PCT/US14/54210, such as the disclosed wearable apparatuses (e.g., a belt or a helmet). However, although embodiments of the danger avoidance apparatus disclosed in this application can work in conjunction with a belt and/or the helmet and the elements in the belt and/or the helmet described in the earlier-filed applications, the apparatus may take the form of a stand-alone device that communicates directly with an emergency communication system, including but not limited to that described in U.S. patent application Ser. No. 14/227,493, U.S. patent application Ser. No. 14/227,499, and International Application Number PCT/US14/54210 without the use of the described belt and/or helmet, and/or one or more of the components thereof. For example, in another exemplary embodiment of a danger avoidance apparatus according to the present disclosure the apparatus does not contain any communication devices or aspects for communication with a system external thereto. In this way, the present disclosure provides for both a stand-alone apparatus that provides danger avoidance without communication (in some fashion) and an interconnected apparatus that provides danger avoidance and communication to some external device or system to alert emergency personnel of the user's emergent situation. In some such embodiments, the external device may be a belt and/or helmet that includes components configured to provide such communication, as explained further below.

FIG. 1, for example, illustrates an emergency alert system that may include a danger avoidance apparatus (or "Karachute"™) as disclosed herein. As will be understood by one of ordinary skill in the art, the embodiments of the danger avoidance apparatus disclosed herein may be configured or operable to work with one or more additional existing emergency alert systems. In this way, FIG. 1 is offered as an example of a system that can be used with embodiments of the present danger avoidance apparatus.

In FIG. 1, the system 100 for use with embodiments of the present disclosure includes a sensory unit (SU) 110, which includes a location device 120, including but not limited to a GPS and/or an accelerometer. Adapted for communicating with a microprocessor 115 integrated into the SU 110, are some additional external communication devices, which include a helmet (and/or belt) 143 that includes one or more sensors, and one or more sensors integrated into an embodiment of the present disclosure, a danger avoidance apparatus 142. In the embodiment of FIG. 1, the microprocessor 115 in the SU 110 can obtain alerts and/or information from any sensor, including one or more sensors in the apparatus 142, through known wireless and/or wired communication protocols. Upon obtaining an alert and/or information that program code executed by the microprocessor 115 determines is problematic, the microprocessor 115, by executing program code, will communicate with a transponder 117, which will communicate with a communication node 140, such as an antenna. The node 140 routes this communication over a network 145 to at least one terminal 150 accessible by an emergency responder.

Embodiments of the present disclosure may concurrently communicate this information, and identification information from the SU 110, to a cloud-based system 155 that will supplement the identification information and/or the geographic information utilizing information stored in one or more cloud-based memory resources 160. The supplemental information is routed, by program code executed by one or more processors 165 in the cloud-based system 155, to the at least one terminal 150 accessible to the emergency responder. In some embodiments of the present disclosure, the node 140 will route the information from the SU 110 to the terminal 150 and the cloud-based system 155 concurrently, while in some embodiments, the information may go to the terminal 150, then to the cloud-based system 155, where it is supplemented, and then back to the terminal 150. In some embodiments, the information from the SU 110, including the location and identification information, may be routed by the node 140, first, to the cloud-based system 155, where it is supplemented, and then, to the terminal 150.

In an embodiment of the present disclosure, the microprocessor 115 in the SU 110 is configured to obtain information and alerts from sensors that are both internal and external to the SU 110, the external sensors include those in the danger avoidance apparatus or Karachute™ 142, via a receiver 116 and communicate this information via a transponder (or transmitter) 117, to a node 140. In an embodiment of the present disclosure, the SU 110 can receive signals from sensors and triggers external to the SU 110, including but not limited to, a helmet 143, and a danger avoidance apparatus 142.

Figure 2:
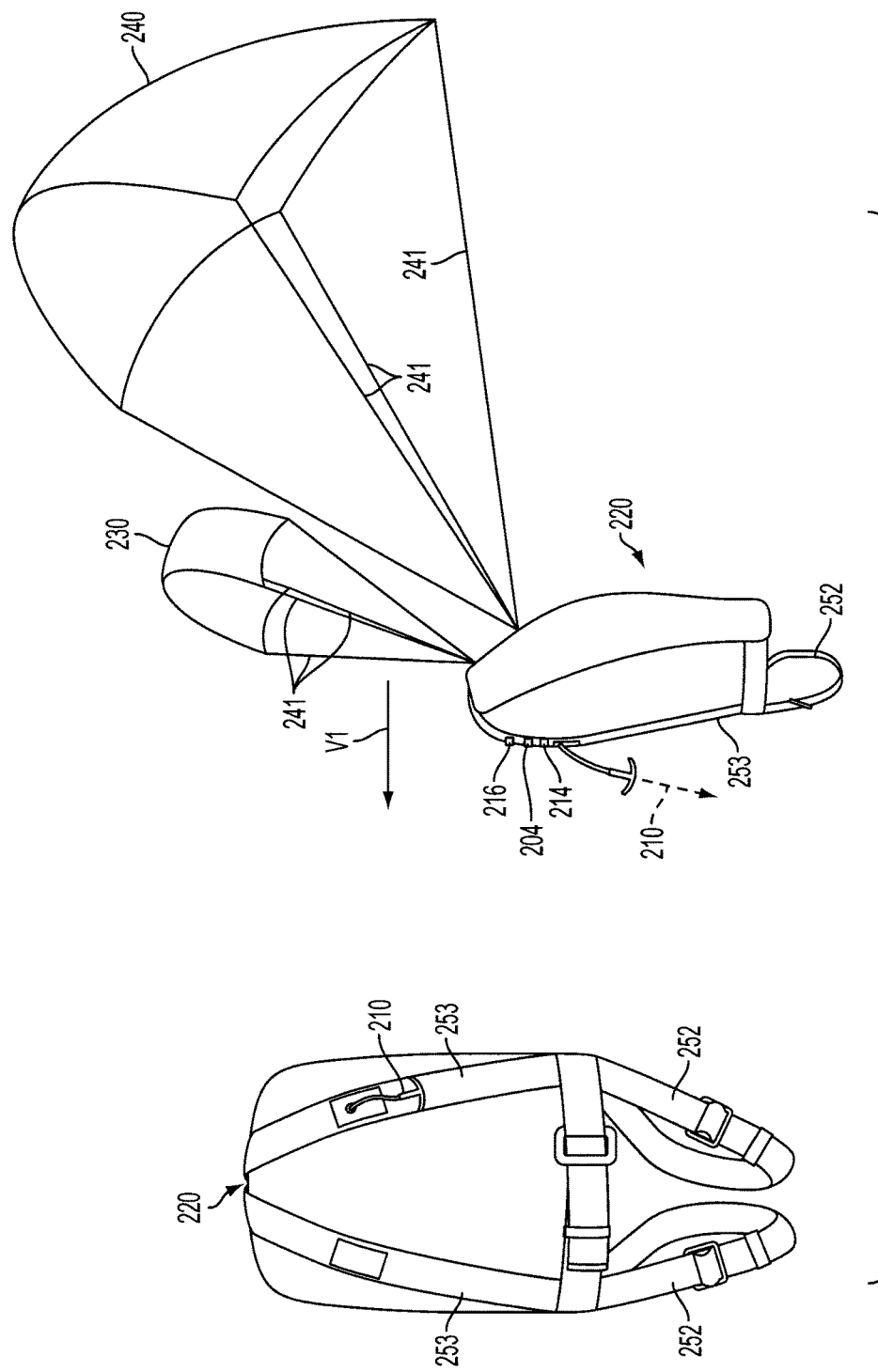
FIG. 2 depicts a perspective view of an exemplary danger avoidance apparatus of the present disclosure.

FIG. 2 depicts an embodiment of a danger avoidance apparatus or Karachute™ 242, such as that discussed in reference to FIG. 1. Referring to FIG. 2, the danger avoidance apparatus 242 includes a container 220 configured to couple to a user. The danger avoidance apparatus 242 may also include a lift providing mechanism 230 movably coupled to the container 220 between a packed position within the container 220 (see FIG. 3) and a deployed position as shown in FIG. 2 exterior to the container 220. In the deployed position as shown in FIG. 2, the lift providing mechanism 230 may be configured to provide lift to a user coupled to the container 220 at a first velocity of the user along a first direction V1 (i.e., a lift force acting substantially opposing gravity). For example, the lift providing mechanism 230 may include an airfoil that is configured or operable to provide lift (i.e., a lift force) to the user at least at the first velocity of the user along a first direction V1 sufficient to elevate the user off the ground surface. In another embodiment, the lift providing mechanism 230 may otherwise be configured or operable to provide lift (i.e., a lift force) to the user at least at the first velocity of the user along a first direction V1 sufficient to elevate the user off the ground surface and carry the user for a distance. As is known in the art, a variety of differing mechanisms, shapes and configurations besides an airfoil may be utilized by the lift providing mechanism 230 to provide lift force at least effective to elevate the user (and the apparatus 242) off the ground surface to an elevated position and, potentially, translate the user along the first direction. In this way, the lift providing mechanism 230 may be operable to remove or separate the user from a dangerous condition located on or about ground surface level.

In some embodiments, the lift providing mechanism 230 may be a canopy kite or airfoil canopy member. In some embodiments, the lift providing mechanism may be non-rigid material that is configured or operable to form an airfoil in its deployed position. In some embodiments the descent control mechanism may be non-rigid material that is configured or operable to form a descending canopy in its deployed position. The lift providing mechanism 230 may be passive in that just the velocity V1 of the user, and thereby the apparatus 242, and potentially a prevailing wind (if present) is sufficient to provide the lift force via the lift providing mechanism 230. In this way, no energy may be necessary or input besides the movement of the user and potentially a prevailing wind for the lift providing mechanism 230 to provide or create the sufficient lift force effective to elevate the user (and the apparatus 242) off the ground surface to an elevated position and translate the user a distance along the first direction. Further, the lift providing mechanism 230 may be effective to elevate the user (and the apparatus 242) off the ground surface to an elevated position and translate the user a distance along the first direction and a second direction.

As also shown in FIG. 2, the apparatus 242 may further include a descent control mechanism 240 movably coupled to the container 220 between a packed position within the container 220 (see FIG. 3) and a deployed position as shown in FIG. 2 exterior to the container 220. In the deployed position as shown in FIG. 2, the descent control mechanism 240 may be configured to control the descent of a user from off or above the ground surface and reduce the velocity of the user along the first direction from the first velocity V1. For example, the descent control mechanism 240 may include a parachute or canopy member that creates a drag force to slow the rate of decent of a user coupled to the apparatus 242 who is elevated above the ground surface such that the user descends in a controlled manner to the ground surface and/or from the first velocity V1 along the first direction. In this way, the lift providing mechanism 230 may be operable to remove or separate the user from a dangerous condition located on or about ground surface level by elevating the user, and the descent control mechanism 240 may be operable to extend the time period of the elevated position, carry the user for a distance, and relatively slowly and safely return the user on or about ground surface level when the dangerous condition has passed or at least becomes less dangerous. For example, in the case of an oncoming avalanche, the lift providing mechanism 230 may be operable to elevate the user above the avalanche such that the avalanche passes underneath the user, and the descent control mechanism 240 may be operable to extend the time period of the elevated position, carry the user for a distance where potentially the avalanche is not occurring, and/or relatively slowly and safely return the user on or about ground surface level when the avalanche has ceased or has at least substantially weakened.

In some embodiments, the descent control mechanism 240 may not include an airfoil shape or otherwise provide any lift force. Rather, in contrast, the descent control mechanism 240 may be configured to increase the drag force of the user and apparatus 242 without provided a lift force. In this way, an elevated user and apparatus 242 may descend and slow from the first velocity V1 along the first direction when the descent control mechanism 240 is in the deployed position (FIG. 2). In alternative embodiments (not shown), the descent control mechanism 240 may be configured or operable to provide lift (i.e., a lift force) to the user.

As also shown in FIG. 2, the apparatus 242 may further include at least one rip or draw cord 210 engaged with the container 220 and selectively operable by the user when the apparatus 242 is worn or otherwise coupled to the user, as described in further detail below. The at least one rip cord 210 may be configured to activate the lift providing mechanism 230 from its packed position within the container 220 (FIG. 3) to its deployed position (FIG. 2), and to subsequently activate the descent control mechanism 240 from its packed position (FIG. 3) to its deployed position (FIG. 2) upon the selective operation of the at least one rip cord 210 by the user. In this way, both the lift providing mechanism 230 and the descent control mechanism 240 may initially be provided within the container 220, and the at least one rip cord 210 may be utilized by the user to selectively deploy them in a staggered manner.

In an embodiment of the present disclosure, when a user senses an emergent condition, for example, an avalanche beneath them and/or an approaching avalanche, the user wearing or otherwise coupled to the container 220 may initially selectively operate or engage the at least one rip cord 210 (e.g., pull the at least one rip cord 210) to first activate the lift providing mechanism 230 into the deployed position (FIG. 2). Once the user has at least been elevated off the ground surface by the lift force created or applied by the lift providing mechanism 230, the user may again selectively operate or engage (e.g., pull the at least one rip cord 210) the at least one rip cord 210 to subsequently activate the descent controlling mechanism 240 into the deployed position (FIG. 2). Once deployed, the descent controlling mechanism 240 may initiate descent of the user if not already occurring and/or slowly control descent of the user back to at least about ground surface level when the avalanche is no longer a threat (e.g., the avalanche has passed by, ended and/or the user was carried away from the location of the avalanche).

Figure 4:
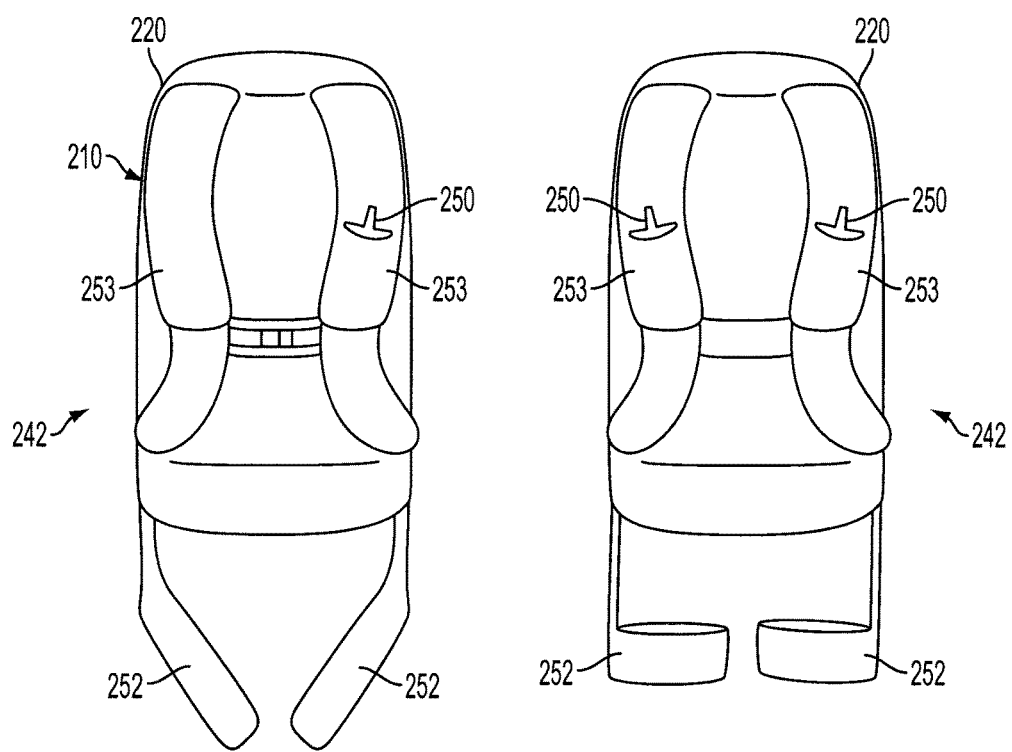
FIG. 4 depicts front views of exemplary embodiments the container portion of FIG. 3.
Figure 10:
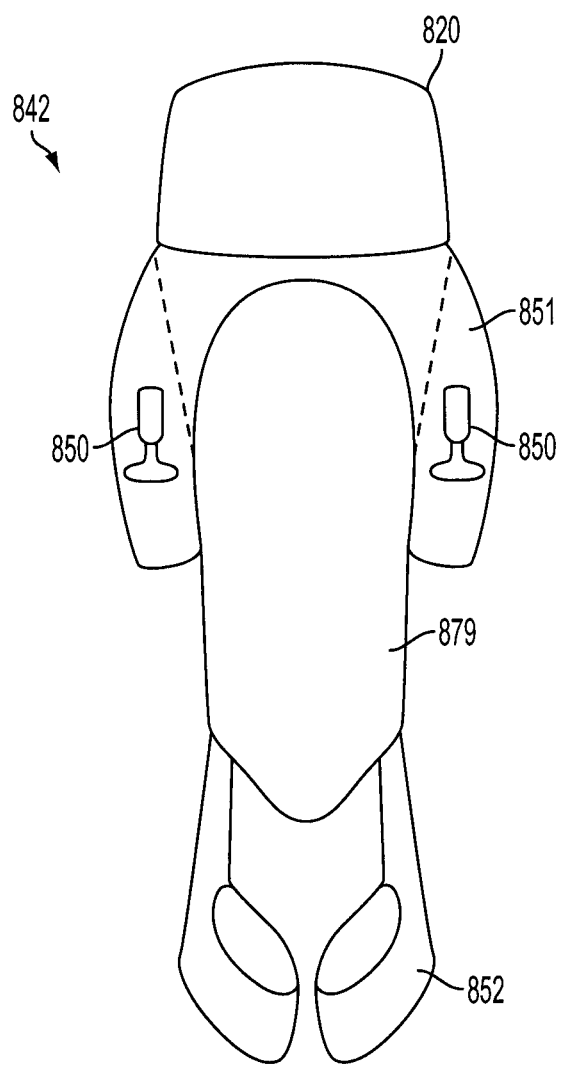
FIG. 10 depicts a front view of the container portion of FIG. 8.

In some embodiments, when the user senses a danger than can be avoided via the apparatus 242 (e.g., a nearby avalanche while traveling at a great enough speed to achieve sufficient lift via the lift providing mechanism 230), the user can operate the at least one rip cord 210 (e.g., pulls the at least one rip cord 210) to activate or deploy the lift providing mechanism 230. The initial operation of the at least one rip cord 210 may also communicate with an external device, including but not limited to the SU 110 of FIG. 1. After deployment of the lift providing mechanism 230 via the at least one rip cord 210 and, potentially, sending an alert that has been communicated with an external device, the user may again engage the at least one rip cord 210 to deploy the descent controlling mechanism 240. In some embodiments the same rip cord 210 may activate the lift providing mechanism 230 (and potentially communicate an alert) and the descent controlling mechanism 240, as shown in FIG. 2. However, in alternative embodiments as shown in FIGS. 4 and 10, the container 220 may include a first and second rip cords 210 each configured to activate one of the lift providing mechanism 230 or the descent controlling mechanism 240.

Figure 13:
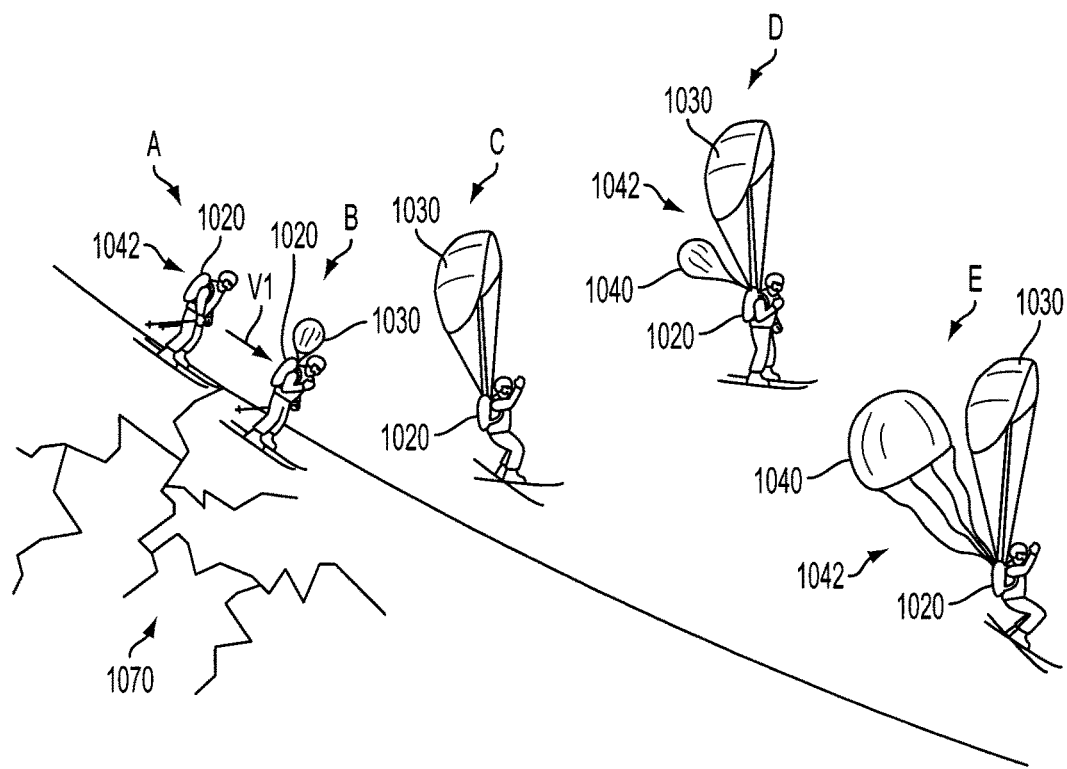
FIG. 13 illustrates the use of an exemplary avoidance apparatus according to the present disclosure.

A full or complete safety activation of the apparatus 242, as illustrated in FIGS. 2 and 13, may thereby include three stages: 1) deployment of the lift providing mechanism 230 from the container 220 via the at least one rip cord 210 to provide the user with lift and elevate the user off the ground surface and out of harms way from the relevant danger; 2) deployment of the descent controlling mechanism 240 via the at least one rip cord 210 to slow the movement of the user and to initiate and/or control descent of the user to the ground surface after the danger has passed; and 3) activation of at least a sensor 214 in the apparatus 242 to communicate with an external device, including but not limited to a receiver in the SU 110. As will be discussed later in reference to various embodiments of the present disclosure, the components of the SU 110 can be internal and/or external to the apparatus 242. The use of an embodiment of the apparatus 242 by a user is illustrated in FIG. 13, and methods of deployment of the apparatus 242 will be discussed in greater detail later in this application.

Returning to FIG. 2, in some embodiments the apparatus 242 may include a sensor 214 that is proximate to the at least one rip cord 210 such that when the rip cord 210 is operated, the sensor 214 is engaged and activated. Once the sensor 214 is engaged, a microcontroller 216 may obtain an alert and/or signal and can communicate the alert to an external system, such as to an embodiment of the belt and/or helmet described in the incorporated patent applications. An embodiment of the present disclosure may include a communication device 204, including but not limited to a transmitter, in order to communicate the alert (e.g., to the belt and/or helmet).

In various embodiments of the present disclosure, an SU (such as the SU 110 of FIG. 1, which may be incorporated in a helmet or belt, for example) can be located in a portion of the apparatus 242 itself, and/or externally located on a helmet and/or a belt, as described in the incorporated patent applications. When an SU (such as the SU 110 of FIG. 1) receives an alert from a sensor 214 and/or other alert mechanism, program code executed by a processor in the microcontroller 216 can communicate with an external node 140, as described in FIG. 1, in order to alert rescue personnel or others to a need for assistance based on activation of at least one of the lift providing mechanism 230 and the descent controlling mechanism 240 from the container 220 via operation of the at least one rip cord 210.

Figure 7:
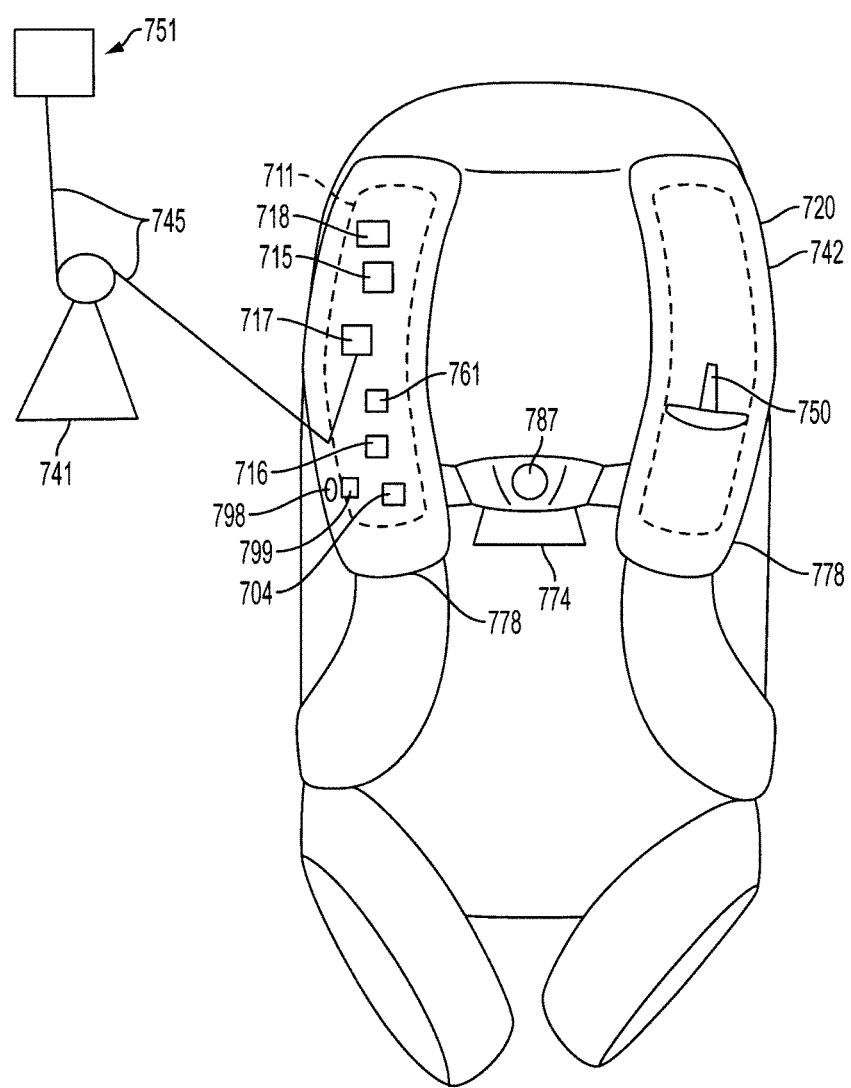
FIG. 7 illustrates another exemplary container portion of an apparatus according to the present disclosure.

Turning to FIG. 7, in a further embodiment of the apparatus 742 the container 720 may include a manual alert button 787 that can be activated by the user of the apparatus 742. Upon initial activation of the manual alert button 787 and/or upon activation of the manual alert button 787 for a predefined period of time, the SU 711 may be configured to receive a signal and operable to send an emergency alert to emergency response personnel or other designated recipients, as described further below. In an alternative embodiment, the apparatus 742 may not include an alert capability configured to alert an external system of activation of a component of the apparatus 742.

As discussed earlier, when program code executed by a processor 715 in the microcontroller determines that predefined threshold conditions have been met based on data obtained from sensors and/or when the microcontroller receives an indicator from the manually-operated button 787, for example, program code executing one or more processors 715 in the microcontroller may communicate (e.g., wirelessly) with the SU 711 and the location device 718 to initiate an alert that can be responded to by emergency response personnel or the like. In some embodiments, a user operating the at least one rip cord 750 with the requisite amount of force to activate the lift providing mechanism 230 and/or the descent control mechanism 240 may meet this threshold.

Returning to FIG. 2, in some embodiments once the microcontroller 216 has communicated with a communication device 204, such as a transmitter, an SU (such as the SU 110 of FIG. 1, which may optionally be provided within a belt or helmet) (not pictured) may be able to communicate via a communications network with emergency personnel or the like and to a cloud-based system, as illustrated in FIG. 1.

As described above with respect to FIG. 2, in some embodiments the apparatus 242 may be activated in two stages. At an initial stage, a user may deploy the lift providing mechanism 230 via operation of the at least one rip cord 210. This deployment provides the user with lift and the ability to "float" or elevate over a hazard, such as a subjacent avalanche. Following the deployment of the lift providing mechanism 230 portion of the apparatus 242, a second stage of activation of the apparatus 242 may include deployment of the descent controlling mechanism 240 via subsequent operation of the at least one rip cord 210, which provides the user assistance in slowing down his or her motion and initiating and/or controlling the descent of the user back to the ground surface (e.g., snow surface) once the hazard, such as an avalanche, has passed or at least partially dissipated. This second stage of activation of the apparatus 242 may assist the user, for example, as an avalanche subsides or passes underneath the user. In some embodiments, both the first and second stage of deployment of the apparatus 242 may be selectively controlled or initiated by the user (e.g., manually initiated versus automatically initiated).

For example, as shown in FIG. 4 the container 220 of the apparatus 242 may include a single rip cord 250. The single rip cord 250 may be configured to activate the lift providing mechanism 230 (not shown) from its packed position in the container 220 to its deployed position upon a first selective operation of the single rip cord 250. The single rip cord 250 may also be configured to activate the descent control mechanism 240 (not shown) from its packed position in the container 220 to its deployed position upon a second selective operation of the single rip cord 250 subsequent to the first operation. Providing a single rip cord 250 may prevent the user from inadvertently deploying the lift providing mechanism 230 and the descent controlling mechanism 240 in the incorrect sequence (i.e., deploying the descent controlling mechanism 240 before deploying the lift providing mechanism 230). In an alternative embodiment as also shown in FIG. 4, the apparatus 242 may include a first rip cord 250 and a second rip cord 250. The first rip cord 250 may be configured to activate the lift providing mechanism 230 from its packed position in the container 220 to its deployed position upon selective operation of the first rip cord 250. The second rip cord 250 may be configured to activate the descent control mechanism 240 from its packed position in the container 220 to its deployed position upon selective operation of the second rip cord 250. As another example, the apparatus 242 may include multiple rip cords 250 for at least one of the lift providing mechanism 230 and the descent controlling mechanism 240. Such redundancy of rip cords 250 may advantageously increase the safety of the apparatus 242.

As will be understood by one of skill in the art, the one or more rip cords 250 of the apparatus 242 may be operably coupled to the lift providing mechanism 230 and the descent controlling mechanism 240 in a manner that enables their activation/deployment upon operation thereof. The at least one rip cord 250 may be operably engaged with the lift providing mechanism 230 and/or the descent controlling mechanism 240 in any manner that effectuates their deployment upon operation thereof. For example, the lift providing mechanism 230 and/or the descent controlling mechanism 240 may be contained within a void or compartment of the container 220 in the packed position. The at least one rip cord 250 may effectuate sealing or closing off of the void or compartment. For example, a portion of the at least one rip cord 250 may draw together an opening of the void or compartment of the container 220 to close the opening. Operation of the at least one rip cord 250 may at least partially remove it from opening of the void or compartment of the container 220 to thereby allow the opening to open and allow the lift providing mechanism 230 and/or descent controlling mechanism 240 through the opening and into the environment (i.e., to the deployed position).

Figure 3:
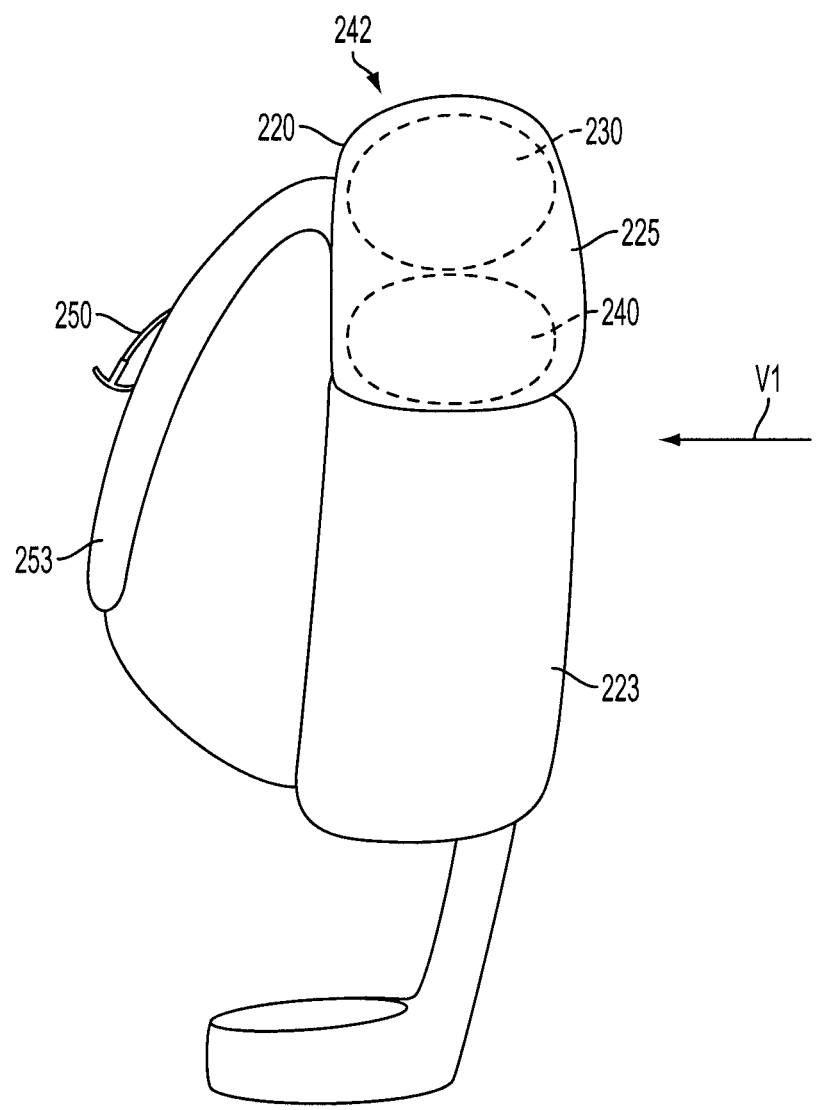
FIG. 3 depicts a side view of a container portion of the avoidance apparatus of FIG. 2.

As shown in FIG. 2, the lift providing mechanism 230 and the descent control mechanism 240 may each be movably coupled to the container 220 via suspension lines 241. In some embodiments, the apparatus 242 and/or container 220 is operable to allow for activation of the lift providing mechanism 230 prior to activation of the descent control mechanism 240. For example, the apparatus 242 and/or container 220 may be operable to allow for activation of the descent control mechanism 240 without interference with the previously activated lift providing mechanism 230, such as tangling or other interference with the suspension lines 241 thereof. As another example, as shown in FIG. 3 in some embodiments the lift providing mechanism 230 and the descent controlling mechanism 240 may be contained within the same compartment 225 of the container 220. In such an arrangement, the lift providing mechanism 230 may be provided above the descent control mechanism 240. In an alternative embodiment (not shown), the lift providing mechanism 230 may be provided within a first compartment of the container 220 and the descent control mechanism 240 may be provided within a second compartment of the container 220. In such an embodiment, the first compartment of the container 220 may be positioned at least one of above and ahead in the first direction V1 of the second compartment.

Embodiments of the container 220 and/or apparatus 242 may include a customized backpack or harness configured to couple to a user, or as an attachment to a preexisting device that is configured to couple to a user, such as a pre-existing backpack or harness. FIG. 3 is an embodiment of the present disclosure utilizing such a customized container 220 and shown before deployment of the lift providing mechanism 230 and the descent controlling mechanism 240. As seen in FIG. 3, the components of the apparatus 242 may be stored in the customized container 220. The configuration of the components in the customized container 220 may enable the deployment to occur in the manner described above, i.e., the lift providing mechanism 230 and then the descent controlling mechanism 240. As seen in FIG. 3, the components of the apparatus 242, including the lift providing mechanism 230 and the descent controlling mechanism 240, may be positioned at the top portion of the container 220, such as in a distinct and separate compartment 225. Such a distinct compartment 225 may be adapted to house the lift providing mechanism 230 and the descent controlling mechanism 240. In another embodiment (not shown), the container 220 may include at least two compartments, with one compartment housing the lift providing mechanism 230 above and another compartment housing the descent controlling mechanism 240.

The container 220, regardless of the number of compartments, may position the lift providing mechanism 230 so that it effectively is on top of the descent controlling mechanism 240, e.g., in order for the lift providing mechanism 230 to have the ability to deploy before (first) the descent controlling mechanism 240 (second). Similarly, in some embodiments the apparatus 242 may be configured to prevent interference, entanglement or other issues that would interfere with the deployment and/or use of the lift providing mechanism 230 and the descent controlling mechanism 240 with respect to each other. For example, in some embodiments at least one of the container 220, the lift providing mechanism 230 and the suspension lines 241 thereof may be configured to provide the deployment position of the lift providing mechanism 230 substantially directly overhead of the user (see FIG. 13), thereby allowing the descent controlling mechanism 240 to be deployed behind the lift providing mechanism 230 in the first direction V1. As another example, in some embodiments at least one of the container 220, the descent control mechanism 240 and the suspension lines 241 thereof may be configured to provide the deployment position of the descent control mechanism 240 substantially behind the deployment position of the lift providing mechanism 230 along the first direction V1 (see FIG. 13), thereby allowing simultaneous deployment and use of the lift providing mechanism 230 and the descent control mechanism 240 without interference therebetween.

As yet another example of controlling the deployment of the lift providing mechanism 230 and the descent control mechanism 240, as seen in FIG. 3 the descent control mechanism 240 may be positioned at a lower portion of the compartment 225, and the lift providing mechanism 230 may be is positioned in an upper portion of the compartment 225 and over the descent control mechanism 240 when the apparatus 242 is worn by a user. By placing the descent control mechanism 240 below the lift providing mechanism 230 in the compartment 225, when the compartment 225 is opened from the top portion thereof the descent control mechanism 240 cannot be deployed ahead of the lift providing mechanism 230.

As will be understood by one of skill in the art, a number of mechanisms can be utilized in order to time the deployment of the lift providing mechanism 230 and then, the descent control mechanism 240 to increase the efficacy of the apparatus 242. For example, an internal timer, optionally in a microcontroller, may disable a portion of the release mechanism until a predefined period has passed after deployment of the lift providing mechanism 230. Alternatively, the rip cord 250 may include a winding mechanism that retracts a pulled rip cord 250 over a predefined period of time. In this embodiment, when a rip cord 250 is pulled, it retracts along a winding mechanism and cannot be re-engaged to deploy the descent control mechanism 240 until the retraction is complete.

Referring to FIG. 4, as described above the activation or deployment mechanism of the apparatus 242 may include a single rip cord 250 or, for example, two distinct rip cords 250. The first rip cord(s) 250 may be positioned in a/both contra-lateral shoulder strap(s) of the container 220 of the apparatus 242. In embodiments including first and second rip cords 250, as shown in FIGS. 2-4, separating the functionality into two distinct rip cords 250 may help avoid inadvertently pulling on the same rip cord 250 more than once and prematurely deploying the descent control mechanism 240 unintentionally. In some embodiments, the descent control mechanism 240 may be deployed automatically upon deployment of the lift providing mechanism 230 and the passage of a predetermined period of time. Such automatic deployment of the descent control mechanism 240 may be controlled by the configuration of elements housed in the apparatus 242. For example, in some embodiments when the lift providing mechanism 230 is deployed, it may pull with it a piece of material enclosing the descent control mechanism 240 therein or attached to the descent control mechanism 240 within the container 220. This piece of material may separate the lift providing mechanism 230 from the descent control mechanism 240 when they are both enclosed in the container 220. The lift providing mechanism 230 may remove the material completely only upon deployment and, therefore, trigger the deployment of the descent control mechanism 240. The deployment of the descent control mechanism 240 may also be motorized or automated. Once the lift providing mechanism 230 has been deployed, an internal timer may clock a predefined period of time and engage the deployment mechanism for the descent control mechanism 240 upon expiration of this time period.

As shown in FIG. 2, the apparatus 242 may include adjustable leg straps 252 and/or shoulder straps 253 affixed to the container 220 to adequately secure the apparatus 242 to a user while maintaining a supportive and comfortable feel both before and after activation of the lift providing mechanism 230 and the descent control mechanism 240. As shown in FIGS. 2 and 3, the lift providing mechanism 230 and the descent control mechanism 240 may be integrated into a customized container 220. As shown in FIG. 3, the container 220 may be configured such that a user has access to interior/exterior compartments. Further, as shown in FIGS. 2-4 the container 220 may be configured or designed to enable integration of the at least one rip cord 210 into at least one of the shoulder straps 253. For example, the shoulder strap 253 may accept passage and securement of the at least one rip cord 210 in the portion of the shoulder straps 253 positioned at the front of the user. Further embodiments of the present disclosure may accept passage and securement of more than one shoulder strap 253 and rip cord 210.

As aforementioned, embodiments of the apparatuses disclosed herein can include elements that enable the apparatus to communicate with external emergency alert systems. U.S. patent application Ser. No. 14/227,493, U.S. patent application Ser. No. 14/227,499, and International PCT Application No. PCT/US14/54210 describe an emergency alert system where certain electronic components that enable the alert are integrated into a belt and/or a helmet that is worn by an individual who is participating in an activity (e.g., alpine skiing). However, in an embodiment of the present disclosure, aspects of the belt and/or the helmet described in these applications can be integrated into the apparatuses disclosed herein, enabling the apparatuses disclosed herein to communicate with an emergency alert system, such as that described in U.S. patent application Ser. No. 14/227,493, U.S. patent application Ser. No. 14/227,499, and International Application Number PCT/US14/54210 without using the described belt and/or the helmet as an additional non-integrated item.

Figure 5:
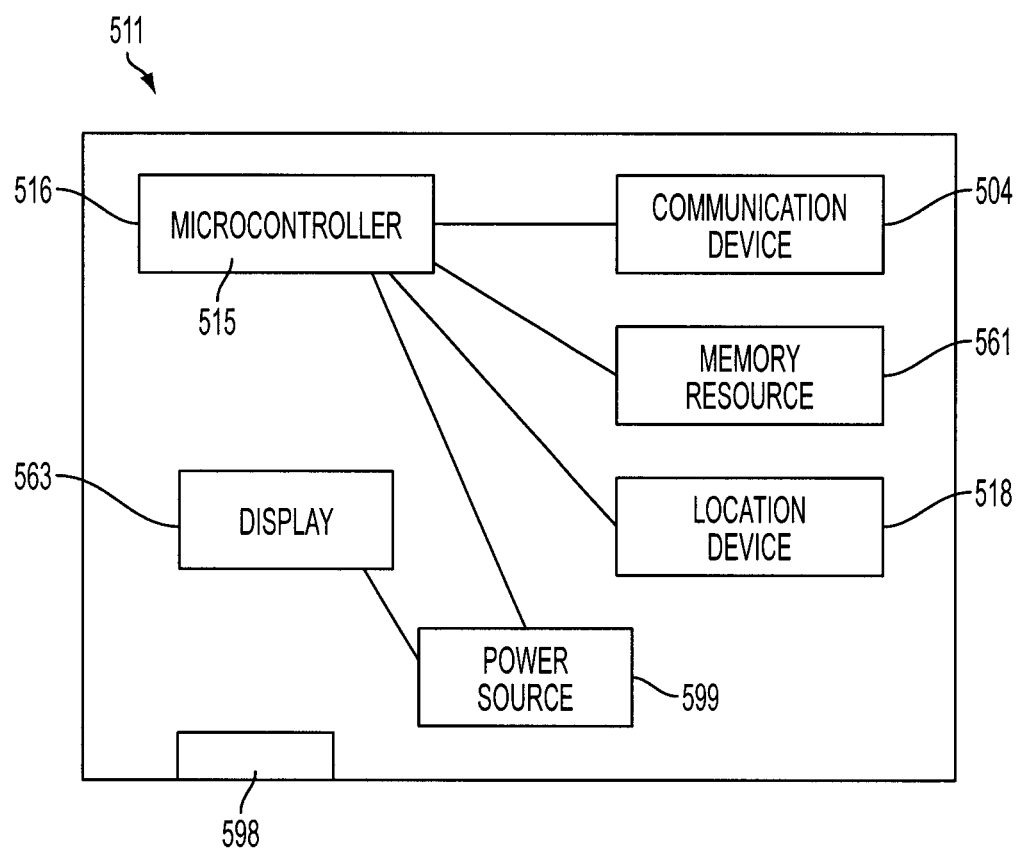
FIG. 5 depicts an apparatus or system that practices one or more aspects of the present disclosure.
Figure 6:
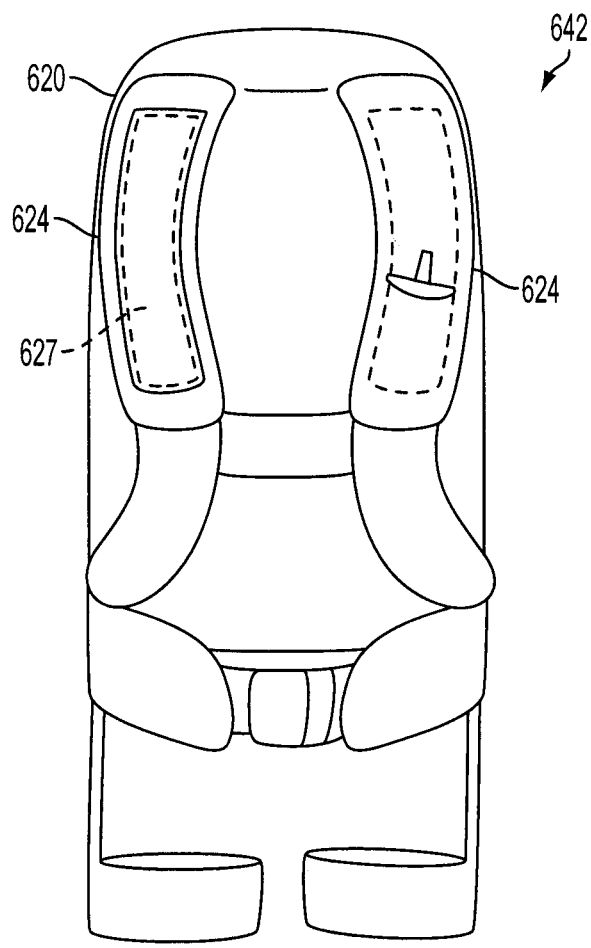
FIG. 6 depicts a front view of the container portion of FIG. 3.

In some embodiments, the apparatuses disclosed herein include an SU as described above. The apparatuses disclosed herein may integrate aspects of the SU described in the aforementioned patent applications incorporated herein. For example, FIG. 5 illustrates a diagram of certain aspects of an embodiment of an SU 511, which may be integrated into certain embodiments of the present disclosure. FIG. 6 is an embodiment of an apparatus 642 that includes at least one area where the SU and/or other electronic components may optionally be integrated. As shown in FIG. 6, the SU 511 of FIG. 5 may be integrated into compartment 627 on a shoulder strap 624 of the container 620, for example. In other embodiments, the apparatus 642 may include an SU positioned elsewhere.

Referring to FIG. 5, an embodiment of the SU 511 that can be integrated into the container 620, for example, is shown. The SU 511 includes a microcontroller 516, that includes a microprocessor 515, an communication device 504, for example, a transmitter or a transponder of the SU 511, a location device 518, including but not limited to a GPS and/or an accelerometer, a power source 599, including but not limited to a one or more batteries or solar cells, and a display 563, including but not limited to, an LED and/or an LED array.

In some embodiments, the display 563, which may be observable by the user of the SU 511, may indicate the power remaining in the power source 599. The power source 599 may power the location device 518 and/or the microcontroller 516, and/or the communication device 504. The microcontroller 516 may include a memory resource 561, including but not limited to internal memory and/or a flash drive. The memory resource 561 may contain a unique identifier.

In one example of an apparatus according to the present disclosure, when a program code executed by a processor in the microcontroller 516, for example, obtains a notification indicating either that the lift providing mechanism has been deployed and/or a manually operated button (not pictured) has been depressed by the user, program code executed by a processing resource in the microcontroller 516 may obtain location information from a location device 518, pull the identifier from the memory resource 561, and/or send this information to the communication device 504, for transmission to a node of a communications network for example. Because the lift providing mechanism (not pictured) of the apparatus may physically translate or move the user and the apparatus itself during use, in some embodiments the location device 518 and the microcontroller 516 may be operable to monitor the location of the user/the apparatus and send updates, as needed, to emergency rescue personnel or another party.

Regarding the power source 599, any power storage, generation and/or providing resource or mechanism may be utilized. For example, when the SU 511 is utilized to communicate a hazard experienced by a user that was created by an avalanche, rechargeable lithium ion batteries may be useful due to their long life, ability to withstand cold temperatures and moisture, and relatively small size. As another example, a "CR" battery may be utilized, potentially in conjunction with a lithium ion battery and/or be substituted for such a battery. However, any other power source 599 may be utilized that generates, releases, creates and/or stores power, or is otherwise configured to provide power to the SU 511.

Returning to again to FIG. 5, a connecting mechanism 598 may enable an individual to connect the SU 511 directly to an external computing device. This connection may be utilized to upload new program code into the microcontroller 516, to recharge the power source 599, diagnose issues with the microcontroller 516, and/or collect data from the SU 511 by interacting with the microcontroller, for example. Standard communication ports such as USB ports and mini-USB ports, or the like, may be utilized in various embodiments of the present disclosure.

To provide protection for the power source 599 when the SU 511 is under pressure, the power source may be contained in a molded housing. In some embodiments, a housing may be molded to accommodate the power source, the microcontroller 516, and the connecting mechanism 598, for example, a port or connector, such as a USB connector. In one embodiment, a flap of a malleable and/or durable material, including but not limited to, rubber, and/or silicone, may cover the port or connector, which may serve as the connecting mechanism 598. The connecting mechanism 598 may be moveable, such as to provide access to the port or connector for recharging purposes. In such an embodiment, when not in use, the port or connector may be covered by the flap in order to provide water resistance.

The elements of the SU 511 of FIG. 5 can be integrated into various portions of the apparatus. FIG. 7, which will be discussed shortly, integrates at least some of these components into a shoulder strap 778 of the container 720 proximate to a rip cord 750. However, a belt closure 774 may also be incorporated with the apparatus 742. The elements of FIG. 5 can similarly be integrated into the apparatus 742, such as within the belt closure 774. Although FIG. 7 depicts only a manual alert button 787 as being integrated into the belt closure 774 of the apparatus 742, in some embodiments of the apparatus 742 additional elements of the SU 511 of FIG. 5 may be integrated into the belt closure 774, for example.

As shown in FIG. 7, some embodiments of the apparatus 742 may include or integrate several features and/or components, such as elements of the belt described in the aforementioned patent applications incorporated herein by reference. In some embodiments, such included or integrated features and/or components may be provided within shoulder straps 778 of the apparatus 742, as described herein. In the embodiment of FIG. 7, the apparatus 742 includes an SU 711, which includes a location device 718, including but not limited to a GPS and/or an accelerometer. The SU 711 may also include a microprocessor 715, which may execute program code that obtains an indication when the apparatus 742 is activated. This indication can include, but is not limited to, engagement of the manual alert button 787, for a predefined period of time and/or the activation of a sensor upon the use of a rip cord 750 by the user (e.g., deployment of the lift providing mechanism).

The microprocessor 715 in the SU 711 may obtain alerts and/or information from any sensor, including one or more sensors in the apparatus 742 (not pictured), through known wireless and/or wired communication protocols. Upon obtaining an alert and/or information that program code executed by the microprocessor 715 determines is problematic, for example, the microprocessor 715, by executing program code, may communicate with a transponder 717. The transponder 717 may communicate with a communication node 741, such as an antenna. The node 741 may route the communication over a network 745 to at least one terminal 751 accessible by an emergency responder or other party.

Embodiments of the present disclosure may concurrently communicate an alert and/or information and identification information from the SU 711 in the apparatus 742 to a cloud-based system 155, as shown in FIG. 1. In some embodiments the cloud-based system 155 may supplement the identification information and/or the geographic information utilizing information stored in one or more cloud-based memory resources 160, for example. The supplemental information may be routed, by program code executed by one or more processors 165 in the cloud-based system 155 for example, to the at least one terminal 150, 751 accessible to the emergency responder. In some embodiments, the node 140, 741 may route the information from the SU 711 to the terminal 150, 751 and the cloud-based system 155 concurrently. In other embodiments, the information may go to the terminal 150, 751, then to the cloud-based system 155, where it is supplemented, and then back to the terminal 150, 751. In some embodiments, the information from the SU 711, such as the location and identification information for example, may be routed by the node 140, 741 to the cloud-based system 155, where it is supplemented, and then to the terminal 150, 751.

In some embodiments, the microprocessor 715 in the SU 711 may be configured to obtain information and alerts from sensors that are both internal and external to the SU 711, including the sensors in the apparatus 742, via a receiver 716 and communicate this information via a transponder (or transmitter) 717, to a node 741. In some embodiments, the SU 711 may receive signals from sensors and triggers external to the SU 711.

In some embodiments, program code executed by the microprocessor 715 may obtain an alert when a user of the apparatus 742 initially operates a rip cord 750. The act of operating (e.g., pulling) the rip cord 750 on the apparatus 742 may activate a sensor, which may communicate with the microprocessor 715. The microprocessor 715 may then communicate with an external emergency response system, as previously described. In some embodiments, the microprocessor 715 may also obtain an alert when a user of the apparatus 742 depresses or otherwise activates the manual alert button 787, optionally, for a predefined period of time.

The apparatus 742 may include a memory resource 761 as shown in FIG. 7. The memory resource 761 may contain a unique identifier and at least some of the program code executed by the microprocessor 715. The unique identifier may work in conjunction with the alert system described in U.S. patent application Ser. No. 14/227,493, U.S. patent application Ser. No. 14/227,499, and International Application Number PCT/US14/54210. Program code executed by the microprocessor 715 may obtain location information from location device 718, for example. The identifier may be pulled from the memory resource 761, and this information may be sent to the communication device 704 in the SU 711, such as for transmission to a node of a communications network.

As shown in FIG. 7, the apparatus 742 may include a power source 799. Depending upon the activities during which the apparatus 742 is worn, certain batteries may provide important advantages. For example, rechargeable lithium ion batteries may provide certain advantages. However, any power source may be utilized by the apparatus 742. In some embodiments, a port 798 may be utilized to charge a power source 799 and/or as a communication port to communicate with and configure the microprocessor 715.

Figure 8:
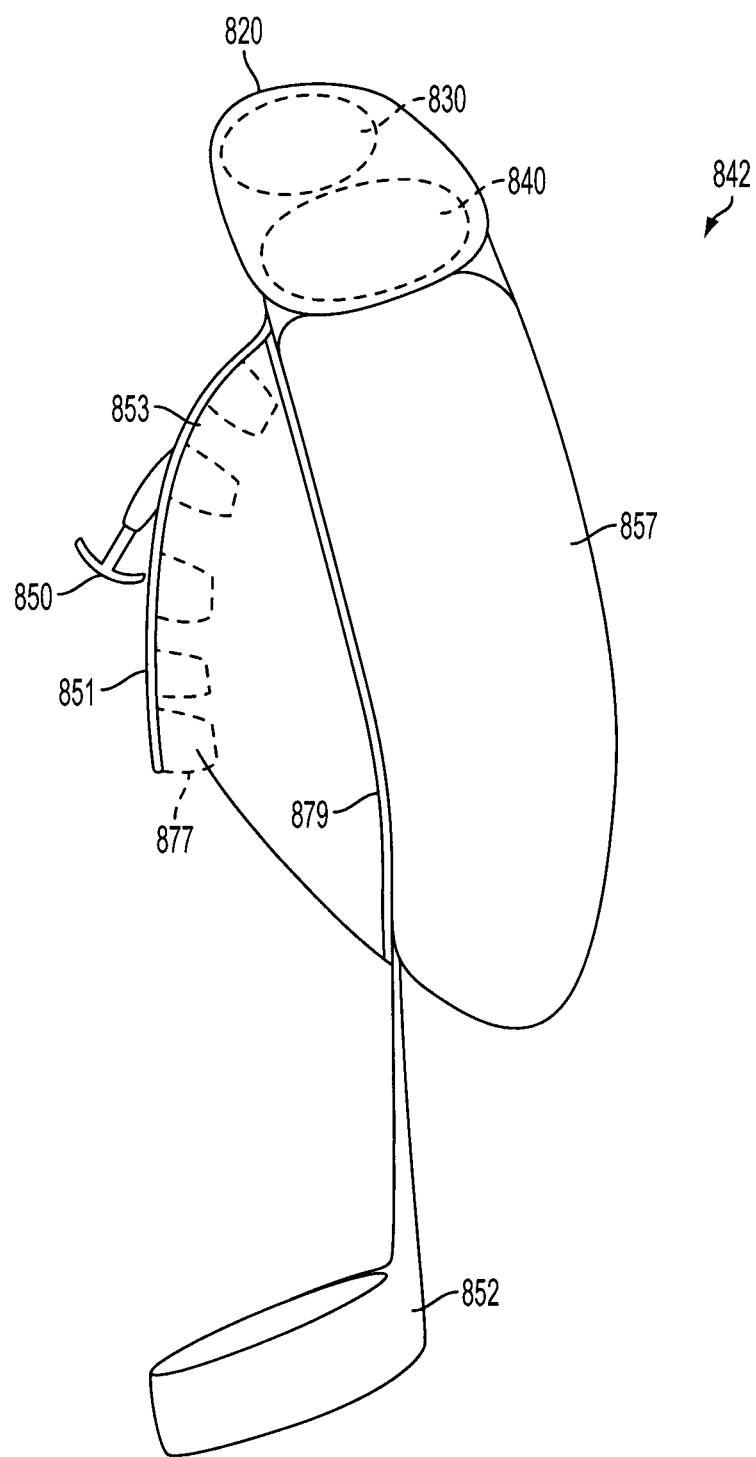
FIG. 8 depicts a side view of another exemplary embodiment of a container portion according to the present disclosure.
Figure 9:
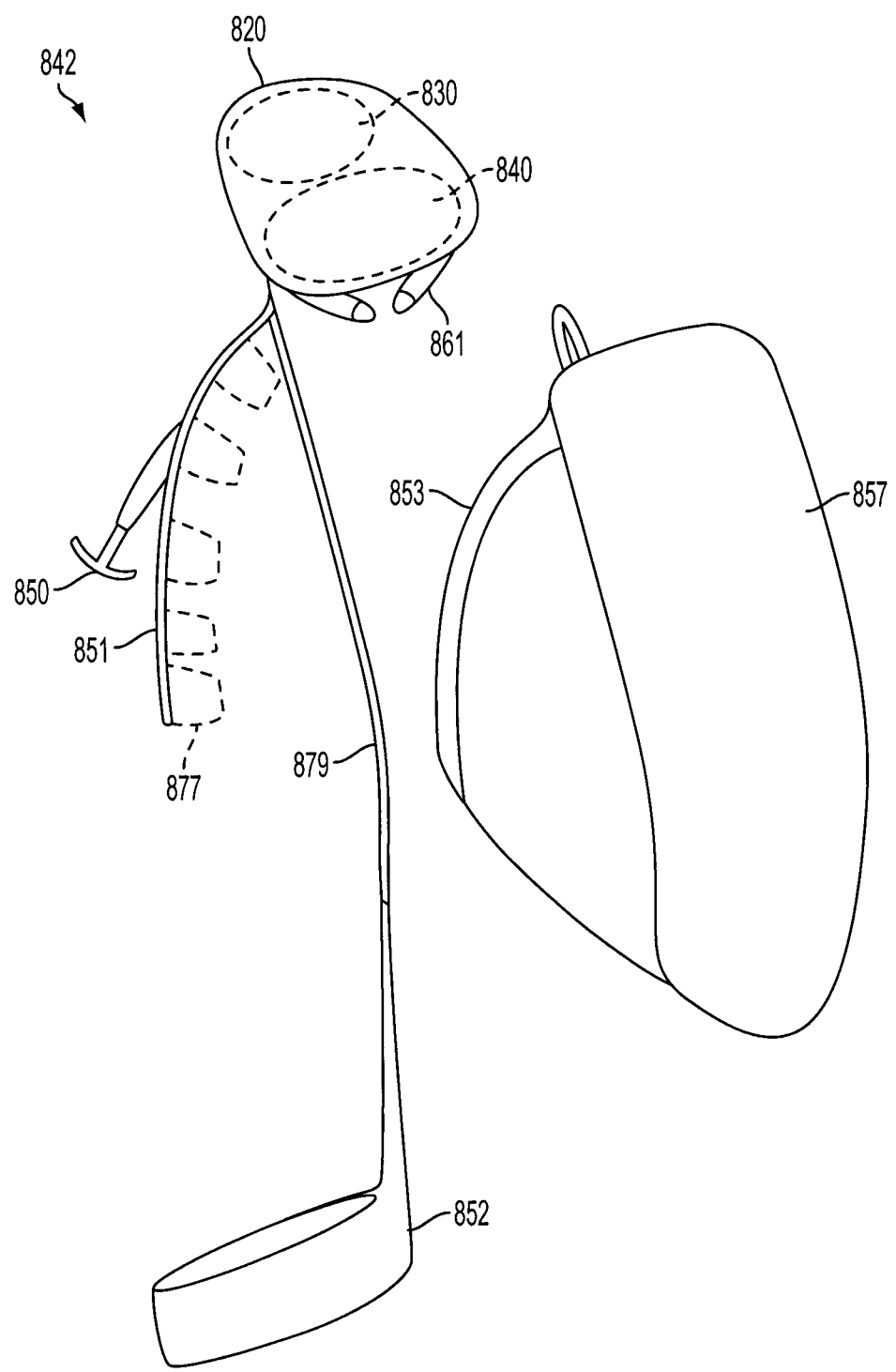
FIG. 9 depicts a side view of the container portion of FIG. 8 partially unassembled.

FIGS. 8-10 illustrate an apparatus 842 that is configured to mate with a pre-existing secondary container 857. The apparatus 842 may or may not include the communication and processing capabilities discussed herein with respect to other apparatus embodiments. As shown in FIGS. 8-10, the apparatus 842 is a stand-alone apparatus that includes the container portion 820 positioned at an upper portion. The lift producing mechanism 830 and the descent control mechanism 840 may be contained within the container portion 820 at the upper portion of the apparatus 842.

The leg straps 852 of the apparatus 842 may be positioned at a lower portion of the apparatus 842 and spaced from the container portion 820. As shown in FIGS. 8-10, a back plate 879 may space the container portion 820 and the leg straps 852. The back plate 879 may be a substantially stiff and supportive structural member that provides rigidity and strength to the apparatus 842. In this way, the other components of the apparatus 842 may be coupled to the back plate 879, which interconnects such components.

The back plate 879 may also provide a relatively large and open space between the container portion 820 and the leg straps 852. As shown in FIGS. 8 and 9, the open space below the container portion 820 allows for the secondary container 857 to abut the back plate 879 and be positioned between the container portion 820 and the leg straps 852. The secondary container 857 may be configured to removably couple to a user, such as via shoulder straps 853. As shown in FIG. 9, the apparatus 842 may include a fastener 861 configured to removably couple with the secondary container 857 to affix the secondary container 857 to the apparatus 842. In this way, the apparatus 842 may be configured to be removably coupled to the secondary container 857.

In some embodiments, the secondary container 857 may be an off-the-shelf backpack or other container. In some embodiments, the secondary container 857 may be a detachable backpack attachment specifically designed to attach to the apparatus 842 via the fastener 861 between the container portion 820 and the leg straps 852. The apparatus 842 may be configured to provide secure attachment and support to the user under conditions requiring lift without being ergonomically obtrusive. As shown in FIGS. 8 and 9, the container 820 may be situated in a manner that enables the user to utilize an off-the-shelf secondary container 857 with the apparatus 842, such as for carrying additional items.

As also shown in FIGS. 8 and 9, the apparatus 842 may include at least one rip cord 850 extending from the container 820. The apparatus 842 may include shoulder strap flaps 851, and the at least one rip cord 850 may be coupled to or positioned proximate to the shoulder strap flaps 851. As shown in FIGS. 8 and 9, the shoulder strap flaps 851 may be configured to extend from the back plate 879 in the general direction of the shoulder straps 853 of the secondary container 857 when the secondary container 857 is attached to the apparatus 842, as shown in FIG. 8. As also shown in FIGS. 8 and 9, the shoulder strap flaps 851 may each include at least one faster 877 configured to removably couple with the shoulder straps 853 of the secondary container 857 and/or the at least one rip cord 850. The fasteners 877 of the shoulder straps 853 may be clips, Velcro, or any other fastener that enables a user to fasten to the at least one rip cord 850 and/or the shoulder straps 853 of the secondary container 857. The fasteners 877 may be configured to affix to the at least one rip cord 850 to the shoulder straps 853 of the secondary container 857. The shoulder strap flaps 851 may be configured to be secured around the shoulder straps 853 of the secondary container 857.

Some embodiments of the apparatuses disclosed herein can be categorized into several categories. Depending upon the embodiment, these categories may not be mutually exclusive. A first category includes embodiments, which do not include any communication or processing capabilities and do not communicate with external systems, as depicted in FIGS. 3 and 4. A second category includes embodiments, such as the embodiment depicted in FIG. 2, that contain electronic elements sufficient to enable communication between the apparatus's elements and a helmet and/or belt apparatus disclosed in the incorporated patent applications in order to alert emergency response personnel. A third category includes embodiments, such as the embodiment of FIG. 7, which include an SU and can be utilized directly to communicate an alert to an emergency alert system or network. A fourth category includes embodiments, such as the embodiment of FIGS. 8-10, which are offered as attachments to existing containers, as opposed to entire containers.

Figure 14:
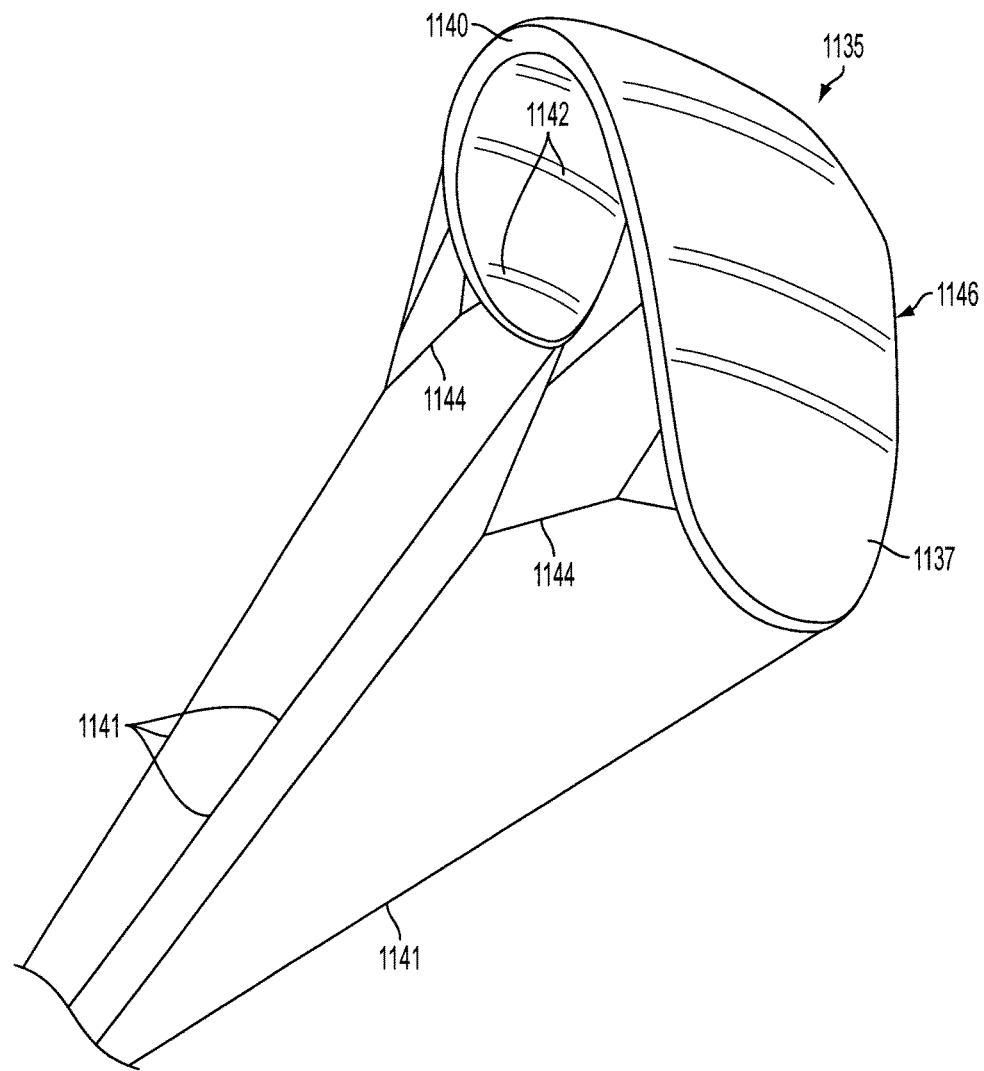
FIG. 14 depicts aspects of an exemplary combined lift providing and descent controlling mechanism according to the present disclosure.

As shown in FIG. 14, in some embodiments an apparatus according to the present disclosure may include a combined lift and descent mechanism 1135. The combined lift and descent mechanism 1135 may be movably coupled to the container portion between a packed position within the container (not shown) and a deployed position exterior to the container via support strings 1141. The combined lift and descent mechanism 1135 may include a canopy 1137 including an airfoil shape formed between a leading edge 1140 and a trailing edge 1146 thereof. The canopy 1137 may also include struts 1142 that provide structural support to the canopy 1137.

The canopy 1137 may be configured to provide lift to the user at a first velocity of the user along a first direction sufficient to elevate the user off the ground surface and translate him or her along the first direction. The combined lift and descent mechanism 1135 may also include bridles configured to provide steering ability of the combined lift and descent mechanism 1135, and thereby the user. The canopy 1137 may also be configured to control the descent and reduce the velocity of the user along the first direction from the first velocity to lower the user from the elevated position initially provided by the canopy 1137. In this way, the canopy 1137 may be configured to balance lift and control descent to provide both functions to a user when the lift and descent mechanism 1135 is deployed.

FIG. 13 demonstrates one embodiment of a method of use of the apparatuses disclosed herein. At instance "A" in FIG. 13, the user of the apparatus 1042 who is a skier in this example, notices a crack 1070 in the terrain indicating a hazardous condition, for example, the beginning stage of an avalanche. At instance "B," the user may operate the at least one rip cord engaged with the container 1020 while moving at a first velocity V1 along a first direction. At instance "C," a lift producing mechanism 1030 is deployed from the container 1020 in a generally upward or overheard direction. The lift producing mechanism 1030 produces an initial lift off the ground surface, such as a snow surface, needed by the user to remove him or her away from the hazardous condition. At instance "D," the user either manually deploys a descent control mechanism 1040 from the container 1020 and/or the descent control mechanism 1040 is deployed automatically at a predetermined time interval after primary deployment of the lift producing mechanism 1030. The descent control mechanism 1040 element may be deployed in a generally backwards direction (a direction opposing V1), as opposed to the generally overhead direction in which the lift producing mechanism 1030 was deployed. At instance "E," the user is settled back down to the surface of the snow after the hazard has passed via the descent control mechanism 1040.

Figure 11:
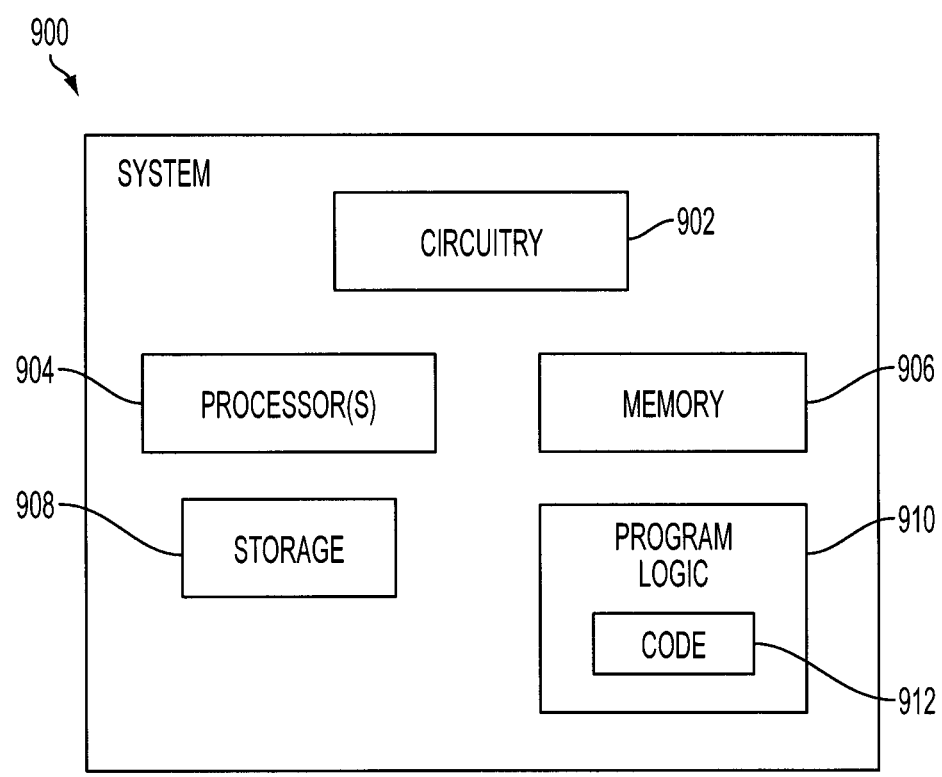
FIG. 11 depicts one embodiment of a single processor computing environment of the present disclosure.

FIG. 11 illustrates a block diagram of a computer resource 900, like microcontroller 515 of FIG. 5, which is part of the technical architecture of certain embodiments of the disclosure. The resource 900 may include a circuitry 902 that may in certain embodiments include a microprocessor 904. The computer system 900 may also include a memory 906 (e.g., a volatile memory device), and storage 908. The storage 908 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the microprocessor 904 or circuitry 902.

In certain embodiments, the program logic 910 including code 912 may be stored in the storage 908, or memory 906. In certain other embodiments, the program logic 910 may be implemented in the circuitry 902. Therefore, while FIG. 11 shows the program logic 910 separately from the other elements, the program logic 910 may be implemented in the memory 906 and/or the circuitry 902.

Using the processing resources of a resource 900 to execute software, computer-readable code or instructions, does not limit where this code can be stored. The terms program logic, code, and software are used interchangeably throughout this application.

Figure 12:
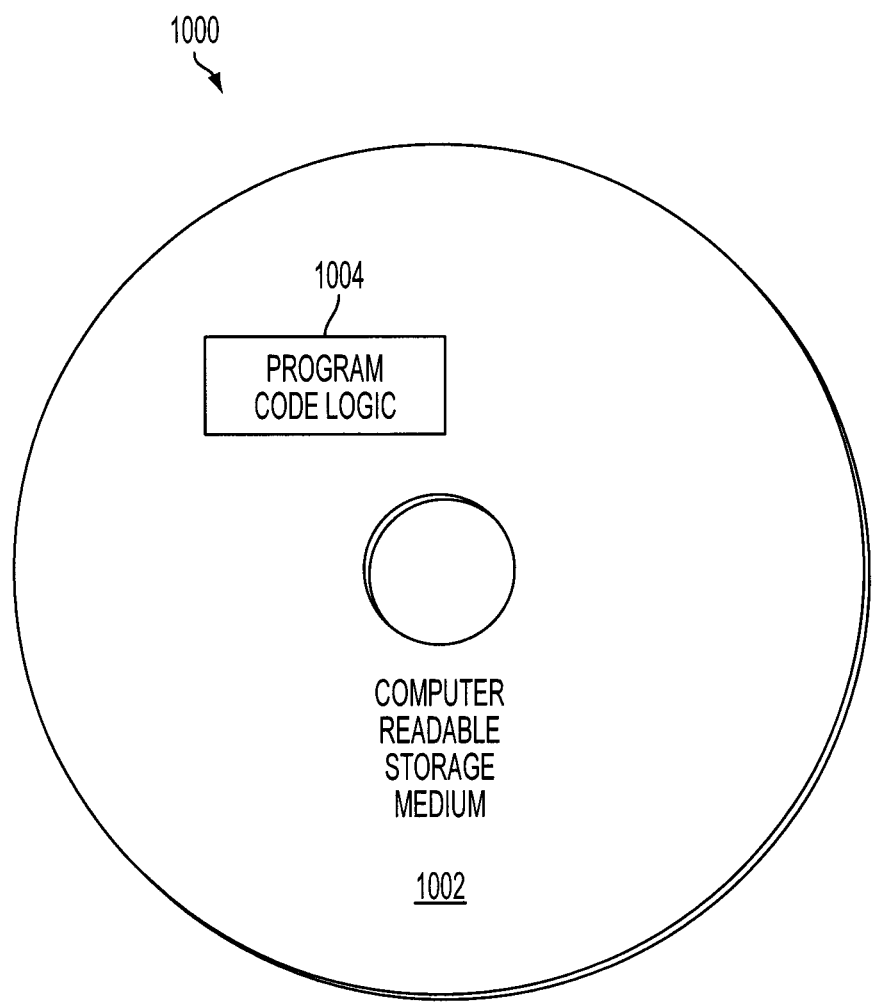
FIG. 12 depicts one embodiment of a computer program product incorporating one or more aspects of the present disclosure.

Referring to FIG. 12, in one example, a computer program product 1000 includes, for instance, one or more non-transitory computer readable storage media 1002 to store computer readable program code means or logic 1004 thereon to provide and facilitate one or more aspects of the technique.

In a further embodiment, apparatuses according to the present disclosure may include some or all of the components or features described herein. For instance, apparatuses according to the present disclosure may not include sensors, which may reduce costs.

One having skill in the art will understand that various electronic technologies, such as wireless communications, including 3G, GSM, wi-fi, or other techniques may be employed for sending and/or receiving information, including alert information.

As will be appreciated by one skilled in the art, aspects of the technique may be embodied as a system, method or computer program product. Accordingly, aspects of the technique may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the technique may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the technique may be written in any combination of one or more programming languages, including an object oriented programming language, such as Java, Smalltalk, C++ or the like, and conventional procedural programming languages, such as the "C" programming language, assembler or similar programming languages. The program code may execute entirely on one computer resource in the system, partly on this one computer resource, as a stand-alone software package, partly on the computer resource and partly on a remote computer or entirely on the remote computer or server. In the latter scenario, the remote computer may be connected to the noted computer resource through any type of network, including a local area network (LAN) or a wide area network (WAN), or the connection may be made to an external computer (for example, through the Internet using an Internet Service Provider).

Aspects of the disclosure may be described herein with reference to flowcharts, illustrations and/or block diagrams of methods, apparatus (systems) and computer program products according to embodiments of the disclosure. It will be understood that each block of flowchart illustrations and/or block diagrams, and combinations of blocks in flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions, also referred to as computer program code, may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the technique. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the descriptions below, if any, are intended to include any structure, material, or act for performing the function in combination with other elements as specifically noted. The description of the technique has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

We claim:

1. A danger avoidance apparatus, comprising:
a container configured to couple to a user;
a lift providing mechanism movably coupled to the container between a packed position within the container and a deployed position exterior to the container including an airfoil that provides lift to the user at a first velocity of the user along a first direction;
a descent control mechanism separate from the lift providing mechanism comprising a parachute or canopy movably coupled to the container between a packed position within the container and a deployed position exterior to the container that controls the descent and reduces the velocity of the user along the first direction from the first velocity; and
at least one rip cord engaged with the container and selectively operable by the user,
wherein the at least one rip cord is configured to activate the lift providing mechanism from the packed position to the deployed position thereof, and subsequently activate the descent control mechanism from the packed position to the deployed position thereof, upon the selective operation of the at least one rip cord by the user.

2. The apparatus of claim 1, wherein the lift providing mechanism and the descent control mechanism are each movably coupled to the container via suspension lines.

3. The apparatus of claim 2, wherein the container is operable to allow for activation of the lift providing mechanism prior to activation of the descent control mechanism.

4. The apparatus of claim 3, wherein the container is operable to allow for activation of the descent control mechanism without interference with the previously activated lift providing mechanism.

5. The apparatus of claim 4, wherein the lift providing mechanism and the descent control mechanism are provided within a first compartment of the container.

6. The apparatus of claim 4, wherein the lift providing mechanism is provided within a first compartment of the container and the descent control mechanism is provided within a second compartment of the container.

7. The apparatus of claim 6, wherein the first compartment of the container is positioned at least one of above the second compartment along a height direction and ahead of the second compartment along the first direction.

8. The apparatus of claim 4, wherein at least one of the lift providing mechanism and the suspension lines of the lift providing mechanism are configured to provide the deployment position of the lift providing mechanism substantially directly overhead of the user.

9. The apparatus of claim 8, wherein at least one of the descent control mechanism and the suspension lines of the lift providing mechanism are configured to provide the deployment position of the descent control mechanism substantially behind the deployment position of the lift providing mechanism along the first direction.

10. The apparatus of claim 1, wherein the descent control mechanism does not provide lift to the container.

11. The apparatus of claim 1, wherein the container is configured to removably couple to the user.

12. The apparatus of claim 11, wherein the container includes at least one of:
at least one leg strap; and
at least one shoulder strap.

13. The apparatus of claim 12, wherein the container includes at least one leg strap and at least one shoulder strap, and wherein a substantially stiff back extends between the at least one leg strap and at least one shoulder strap.

14. The apparatus of claim 11, wherein the apparatus is configured to removably couple to a device that is configured to removably couple to the user.

15. The apparatus of claim 1, wherein the lift providing mechanism comprises a non-rigid material configured to form the airfoil in the deployed position.

16. The apparatus of claim 1, wherein the descent control mechanism comprises a non-rigid material configured to form a descending canopy in the deployed position.

17. The apparatus of claim 1, wherein the at least one rip cord is configured to activate the lift providing mechanism from the packed position to the deployed position thereof upon a first selective operation of the rip cord, and to activate the descent control mechanism from the packed position to the deployed position thereof upon a second selective operation of the rip cord subsequent to the first operation.

18. The apparatus of claim 1, wherein the at least one rip cord includes a first rip cord configured to activate the lift providing mechanism from the packed position to the deployed position thereof upon selective operation of the first rip cord, and a second rip cord configured to activate the descent control mechanism from the packed position to the deployed position thereof upon selective operation of the second rip cord.

19. The apparatus of claim 1, further comprising a sensor communicatively coupled to the at least one rip cord, wherein the sensor is activated in response to the selective operation of the at least one rip cord.

20. The apparatus of claim 19, further comprising a microcontroller communicatively coupled to the sensor configured to obtain an alert from the sensor when the sensor is activated.

21. The apparatus of claim 20, further comprising a communication device communicatively coupled to the microcontroller and configured to communicate the alert to a node on a communications network external to the apparatus.

22. The apparatus of claim 21, wherein the microcontroller is communicatively coupled to the communication device and the sensor, wherein the microcontroller is configured to relay communication between the sensor and the communication device, and wherein the microcontroller is further configured to supplement communications through the microcontroller with additional data.

23. The apparatus of claim 21, further comprising a location device communicatively coupled to the microcontroller, wherein the microcontroller obtains location information from the location device, and wherein the alert comprises the location information.

24. The apparatus of claim 21, further comprising a manual alert button communicatively coupled to the microcontroller, wherein activating the manual alert button is configured to send the alert to the communication device.

25. The apparatus of claim 24, further comprising a belt portion comprising a closure, wherein at least one of the microcontroller, manual alert button, location device, and the communication device are internal to the closure.

26. The apparatus of claim 1, wherein upon activation of the lift providing mechanism via the at least one rip cord while the user is traveling at least at the first velocity along the first direction, the lift providing mechanism lifts the user from a first location on the ground surface and translates the user to a first elevated position off the ground surface.

27. The apparatus of claim 26, wherein upon activation of the descent control mechanism via the at least one rip cord subsequent to activation of the lift providing mechanism, the user is navigated from the first elevated position to a second location on the ground surface.

28. The apparatus of claim 1, further comprising:
a memory configured to store a unique identifier;
a processor in communication with the memory;
a trigger in communication with the processor, wherein the trigger is activated by selective operation of the at least one rip cord by the user;
a location device in communication with the processor; and
a transponder in communication with the processor,
wherein the combined apparatus is configured to perform a method, the method comprising:
obtaining, by the processor, data indicating that the trigger has been activated;
determining, by the processor, that the data indicates an emergency condition;
based on the determining, obtaining, by the processor, location information from the location device;
based on the determining, obtaining, by the processor, the unique identifier from the memory; and
communicating, by the processor, the location information and the unique identifier to a node via a network connection by accessing the transponder.

* * * * *